United States Patent
Sekula et al.

(10) Patent No.: US 10,322,053 B2
(45) Date of Patent: Jun. 18, 2019

(54) PIECE OF FITNESS EQUIPMENT

(71) Applicant: Airpressure Bodyforming GmbH, Berchtesgaden (DE)

(72) Inventors: Oliver Sekula, Berchtesgaden (DE); Hubert Greinwalder, München (DE); Gert Rechenmacher, Villach (AT)

(73) Assignee: AIRPRESSURE BODYFORMING GMBH, Berchtesgaden (DE)

( * ) Notice: Subject to any disclaimer, the term of this patent is extended or adjusted under 35 U.S.C. 154(b) by 892 days.

(21) Appl. No.: 14/764,957

(22) PCT Filed: Jan. 9, 2014

(86) PCT No.: PCT/EP2014/050314
§ 371 (c)(1),
(2) Date: Jul. 30, 2015

(87) PCT Pub. No.: WO2014/117984
PCT Pub. Date: Aug. 7, 2014

(65) Prior Publication Data
US 2016/0008205 A1 Jan. 14, 2016

Related U.S. Application Data

(60) Provisional application No. 61/759,049, filed on Jan. 31, 2013.

(30) Foreign Application Priority Data

Jan. 31, 2013 (DE) .................. 10 2013 101 007

(51) Int. Cl.
*A61H 1/00* (2006.01)
*A61H 9/00* (2006.01)
(Continued)

(52) U.S. Cl.
CPC .............. *A61H 1/008* (2013.01); *A61H 9/005* (2013.01); *A61H 9/0078* (2013.01);
(Continued)

(58) Field of Classification Search
CPC ...... A61H 1/008; A61H 9/005; A61H 9/0092; A61H 9/0078; A61H 2201/5048;
(Continued)

(56) References Cited

U.S. PATENT DOCUMENTS 3,920,006 A 11/1975 Lapidus
5,437,610 A * 8/1995 Cariapa ................ A61H 9/0078
128/DIG. 20

(Continued)

FOREIGN PATENT DOCUMENTS

EP 1248586 B1 3/2004
EP 1307168 B1 4/2005
(Continued)

OTHER PUBLICATIONS

Third Party Observation papers filed in corresponding European Patent Application No. 14189960.9 submitted on Oct. 5, 2015 containing screen shots of four youtube.com videos dated Jul. 30, 2012, Jan. 29, 2013, Feb. 27, 2012, and Jun. 25, 2012.
(Continued)

*Primary Examiner* — Garrett K Atkinson
(74) *Attorney, Agent, or Firm* — Thomas B. Ryan; Harter Secrest & Emery LLP

(57) ABSTRACT

A piece of fitness equipment comprises a carrier for carrying a pump on a body part of a person. The carrier comprises a main body having a first end and a second end, a fastener capable of connecting the first end and the second end with each other, and a holder for detachably attaching the pump to the main body.

17 Claims, 24 Drawing Sheets

Figure 1:
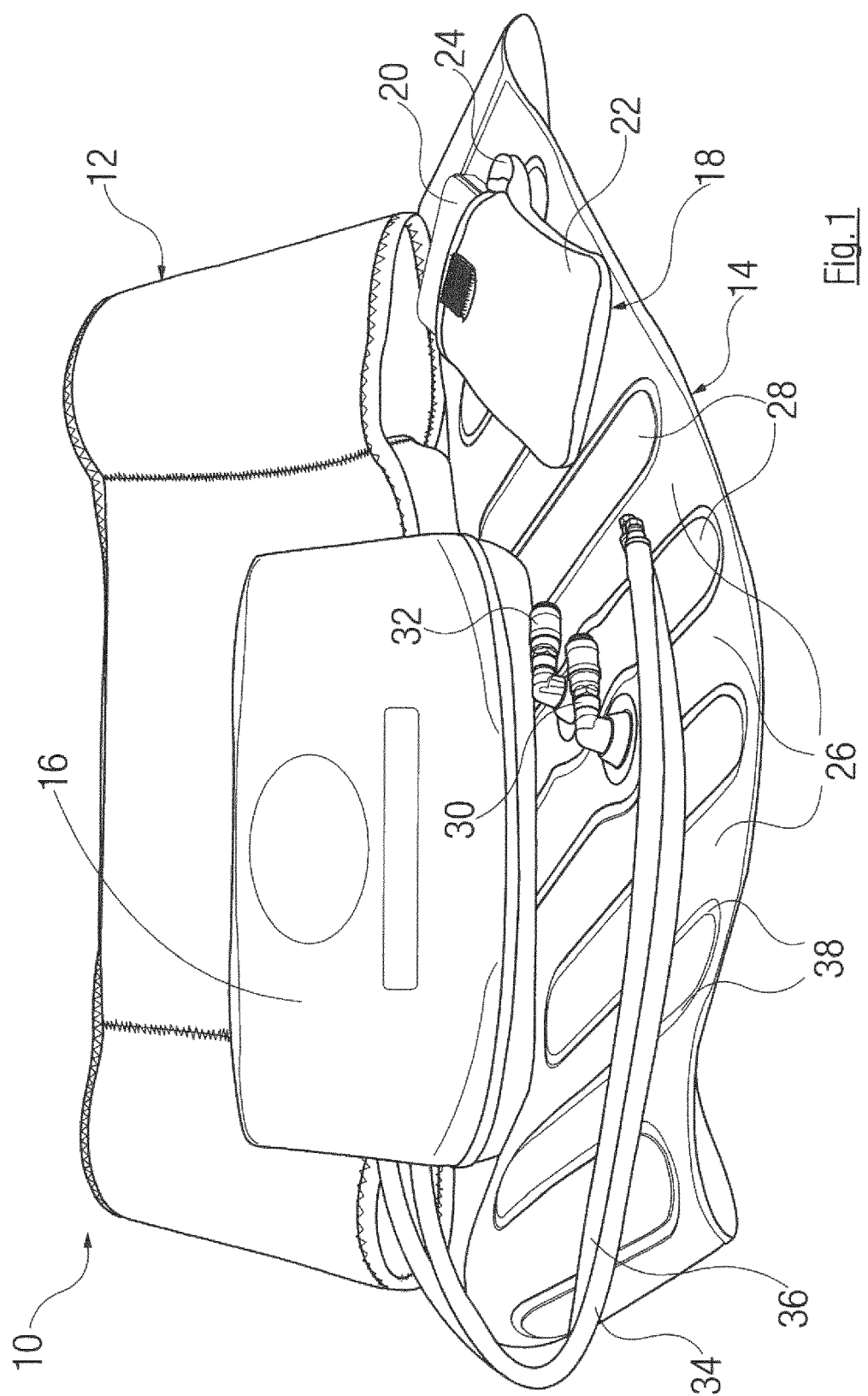

(51) Int. Cl.
*H02J 7/00* (2006.01)
*A63B 22/00* (2006.01)
*A63B 22/02* (2006.01)
*A63B 22/06* (2006.01)
*A63B 23/02* (2006.01)

(52) U.S. Cl.
CPC ....... *A61H 9/0092* (2013.01); *A63B 23/0205* (2013.01); *A61H 2201/164* (2013.01); *A61H 2201/165* (2013.01); *A61H 2201/1619* (2013.01); *A61H 2201/1635* (2013.01); *A61H 2201/502* (2013.01); *A61H 2201/5048* (2013.01); *A61H 2201/5071* (2013.01); *A61H 2205/00* (2013.01); *A61H 2205/08* (2013.01); *A61H 2205/083* (2013.01); *A63B 22/0056* (2013.01); *A63B 22/02* (2013.01); *A63B 22/0605* (2013.01); *A63B 2208/053* (2013.01); *H02J 7/0047* (2013.01)

(58) Field of Classification Search
CPC ........ A61H 2205/083; A61H 2201/502; A61H 2201/165; A61H 2201/164; A61H 2201/1635; A61H 2201/1619; A61H 2205/08; A61H 2205/00; A61H 2201/5071; H02J 7/0047; A63B 23/0205; A63B 2208/053; A63B 22/0605; A63B 22/02; A63B 22/0056
See application file for complete search history.

(56) References Cited

U.S. PATENT DOCUMENTS

| | | | |
|---|---|---|---|
| 5,490,820 A * | 2/1996 | Schock | A61H 9/0078 601/1 |
| 5,806,512 A * | 9/1998 | Abramov | A61H 9/0078 128/204.18 |
| 5,938,627 A * | 8/1999 | Hickman | A61H 9/0078 601/149 |
| 6,086,551 A * | 7/2000 | Allen | A61F 5/0102 2/102 |
| 7,077,794 B1 | 7/2006 | Bray | |
| 7,871,387 B2 * | 1/2011 | Tordella | A61F 5/34 128/DIG. 20 |
| 7,879,069 B2 * | 2/2011 | Lee | A61B 17/1355 601/151 |
| 7,931,607 B2 * | 4/2011 | Biondo | A61G 5/006 128/845 |
| 8,192,381 B2 * | 6/2012 | Nozzarella | A61H 9/0078 601/152 |
| 2002/0042583 A1 | 4/2002 | Barak et al. | |
| 2002/0062515 A1 * | 5/2002 | Wang | A41D 1/06 2/227 |
| 2002/0089304 A1 * | 7/2002 | Lew | G01S 19/18 320/107 |
| 2003/0032904 A1 | 2/2003 | Egger | |
| 2003/0074711 A1 * | 4/2003 | Iversen | A61H 7/001 2/69 |
| 2003/0230474 A1 * | 12/2003 | Marmaropoulos | H01H 1/12 200/547 |
| 2004/0054306 A1 * | 3/2004 | Roth | A61H 9/0078 601/152 |
| 2005/0070405 A1 | 3/2005 | Egger | |
| 2005/0187500 A1 | 8/2005 | Perry et al. | |
| 2006/0122544 A1 * | 6/2006 | Ciluffo | A41D 13/0015 601/15 |
| 2006/0242746 A1 * | 11/2006 | Hashash | A41D 13/018 2/69 |
| 2007/0135743 A1 * | 6/2007 | Meyer | A61H 9/0078 601/152 |
| 2008/0222769 A1 * | 9/2008 | Natonson | A61H 9/0078 2/70 |
| 2008/0222771 A1 * | 9/2008 | Natonson | A61H 9/0078 2/102 |
| 2010/0199405 A1 * | 8/2010 | Nelson | A41D 13/0051 2/102 |
| 2010/0210981 A1 | 8/2010 | Hofmann | |
| 2010/0292619 A1 * | 11/2010 | Redington | G06F 19/00 601/84 |
| 2011/0288458 A1 * | 11/2011 | Jones | A61H 9/0057 601/149 |
| 2012/0022416 A1 * | 1/2012 | Munoz | A61H 9/0092 601/152 |
| 2012/0065561 A1 * | 3/2012 | Ballas | A61H 9/0021 601/152 |
| 2012/0089059 A1 | 4/2012 | Olson | |

FOREIGN PATENT DOCUMENTS

| | | |
|---|---|---|
| EP | 2168553 A1 | 3/2010 |
| WO | 2000072797 A1 | 12/2000 |
| WO | 2001052787 A2 | 1/2002 |
| WO | 2003030808 A1 | 4/2003 |
| WO | 2004084790 A1 | 10/2004 |
| WO | 2005016218 A1 | 2/2005 |
| WO | 2006033114 A2 | 3/2006 |
| WO | 20070137313 A1 | 12/2007 |

OTHER PUBLICATIONS https://www.youtube.com/watch?v=nhbLDLQCuJk, Slim Belly und Kurse.mp4, reportedly published on YouTube website by lapidus2010 on Jul. 30, 2012. (E1).

https://www.youtube.com/watch?v=zqYV1xiYVGw, Slim Belly 2.0 & Dirk Bauchtraining, reportedly published on YouTube website by 4FunFitness on Jan. 29, 2013. (E2).

https://www.youtube.com/watch?v=GfQ4F76GtG4, Slim Belly—by Airpressure Bodyforming, reportedly published on YouTube website by InMotionJuelich on Feb. 27, 2012. (E3).

https://www.youtube.com/watch?v=8iQQf7a-7SY, Slim Belly, reportedly published on YouTube website by Fitundaktivpark on Jun. 25, 2012. (E4).

PCT/EP2014/050314, International Search Report of the International Search Authority (ISR) dated Jul. 15, 2014 (3 pages).

PCT/EP2014/050314, International Preliminary Report on Patentability (IPRP) dated Aug. 4, 2015 (11 pages).

PCT/EP2014/050323, International Search Report of the International Searching Authority (ISR) dated Jul. 23, 2014 (4 pages).

PCT/EP2014/050323, International Preliminary Report on Patentability (IPRP) dated Aug. 4, 2015 (English translation, 12 pages).

* cited by examiner

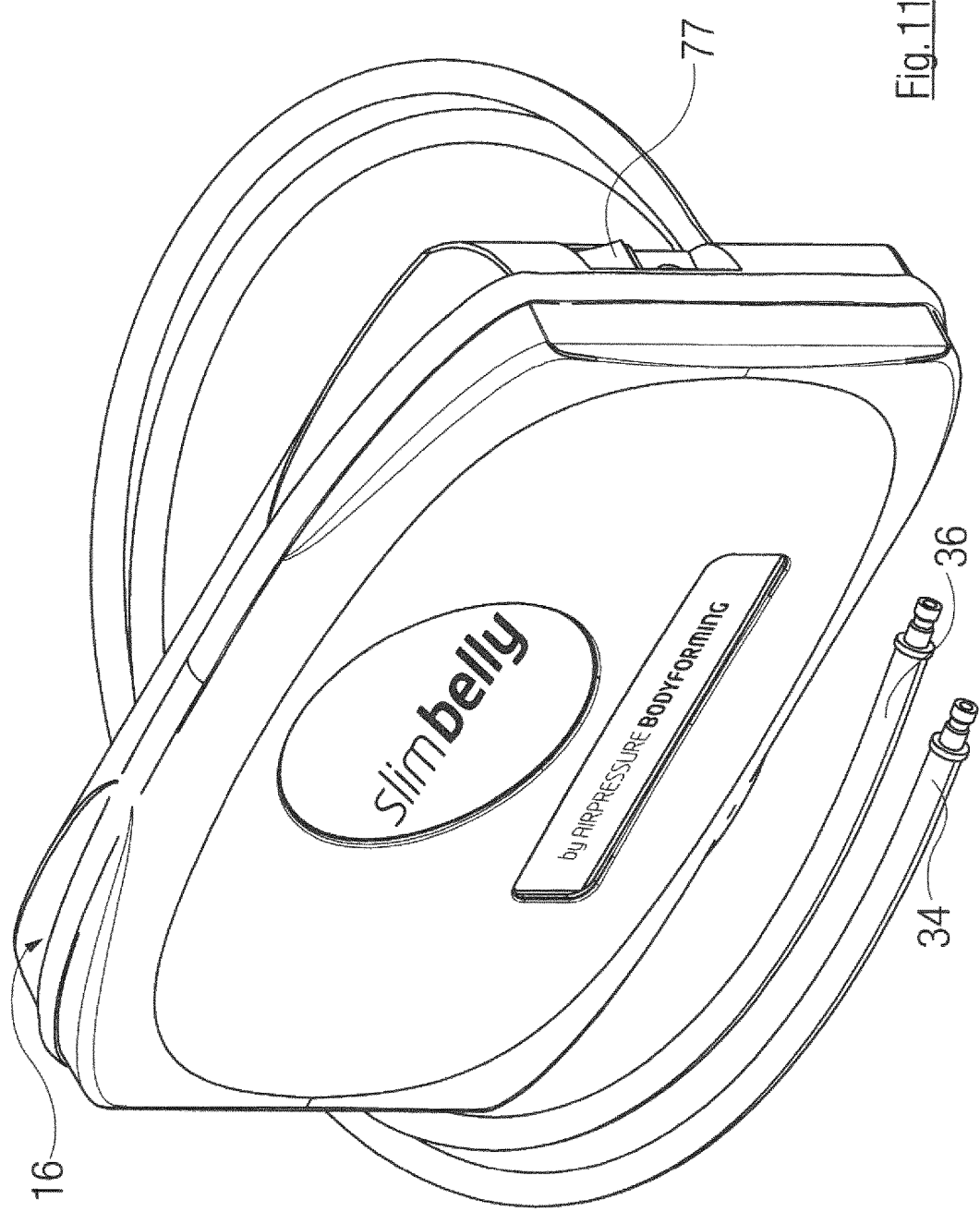

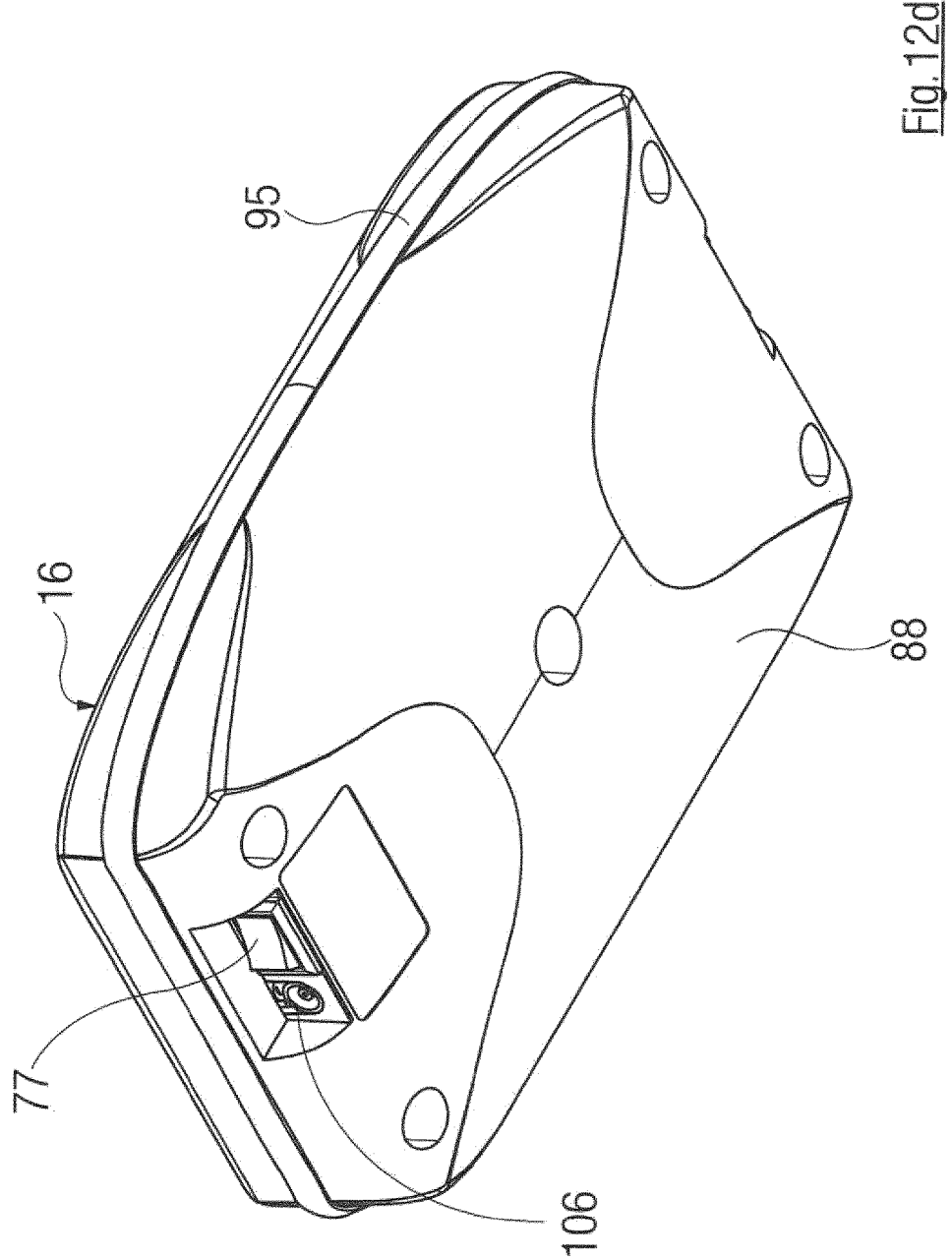

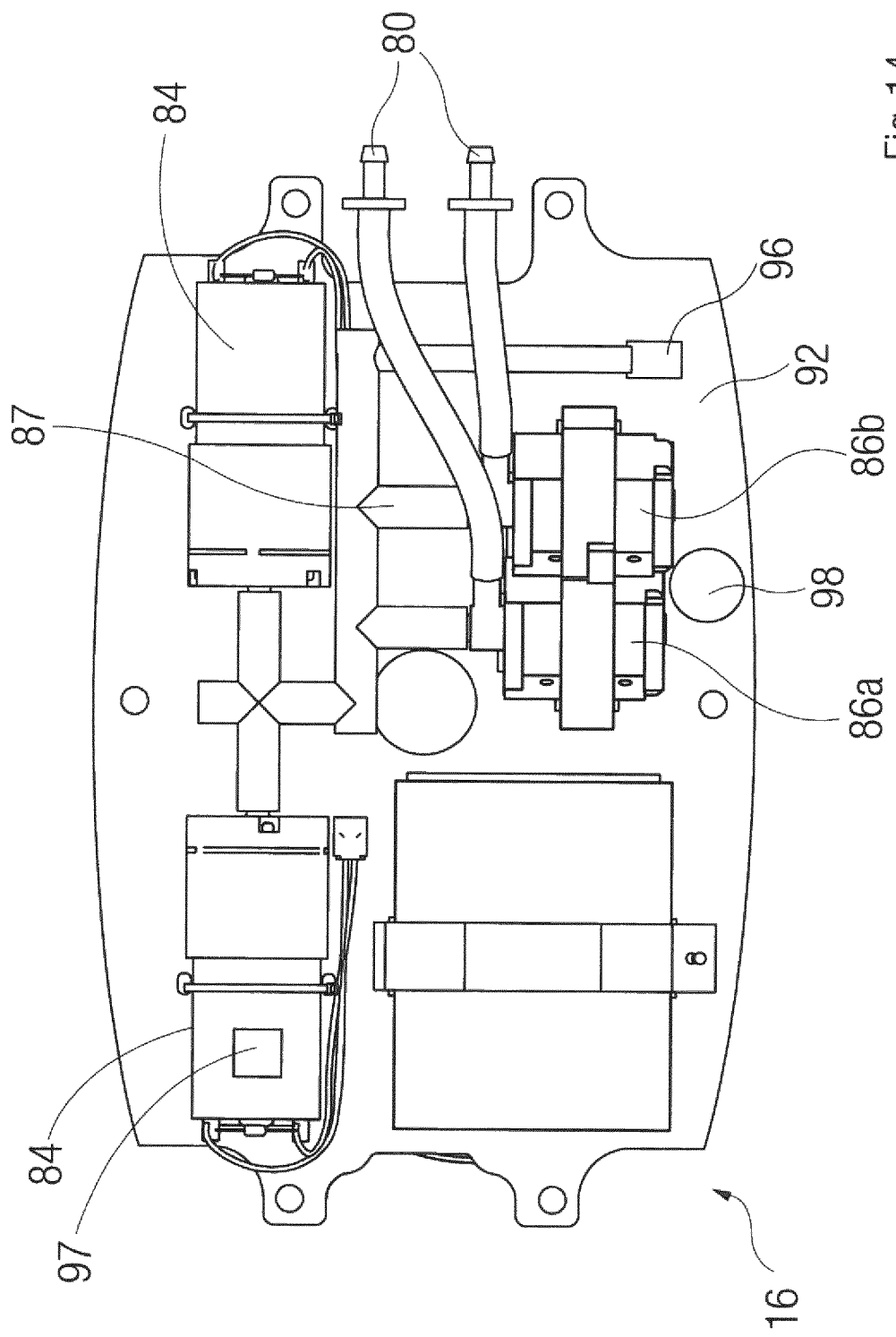

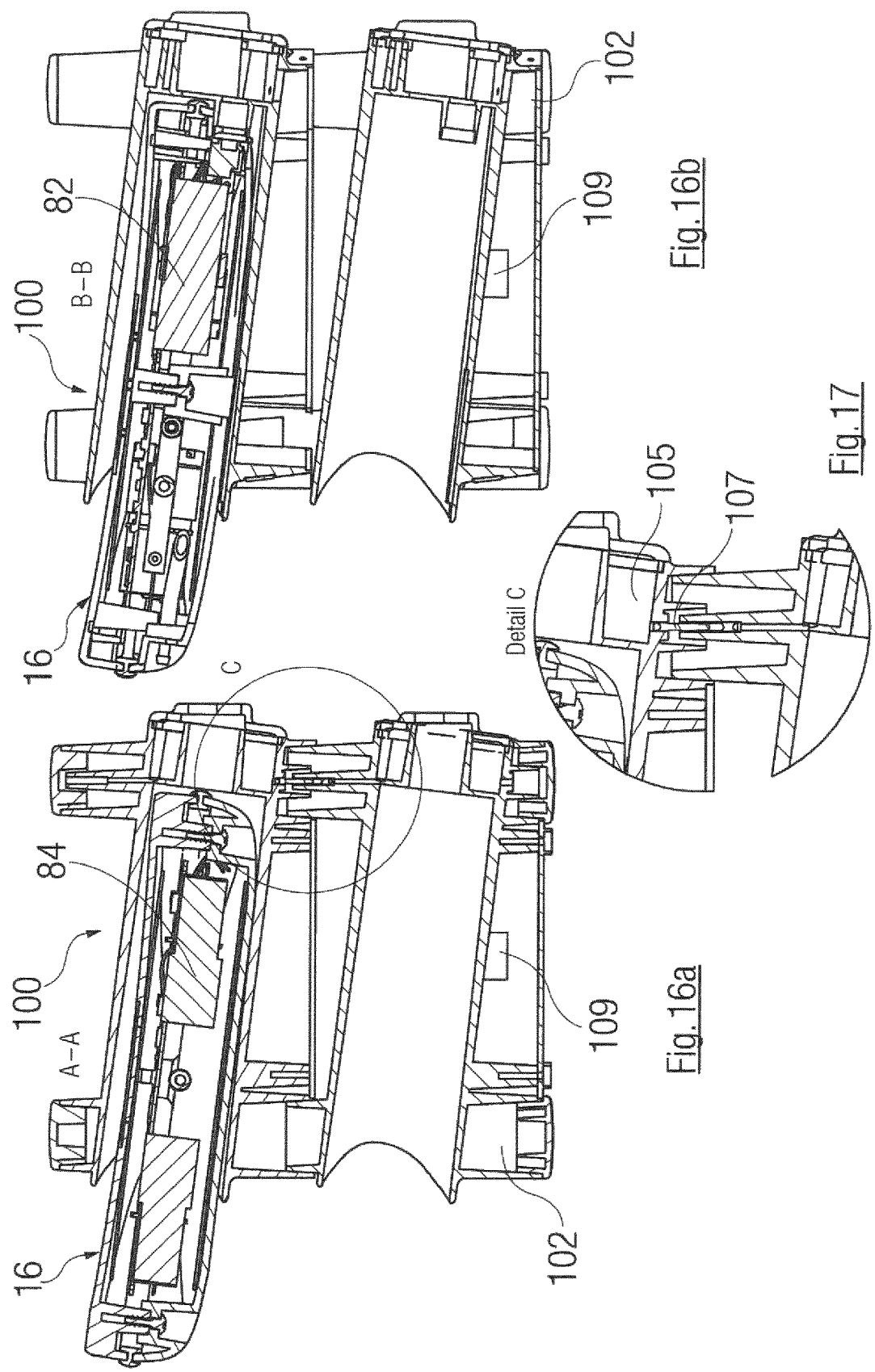

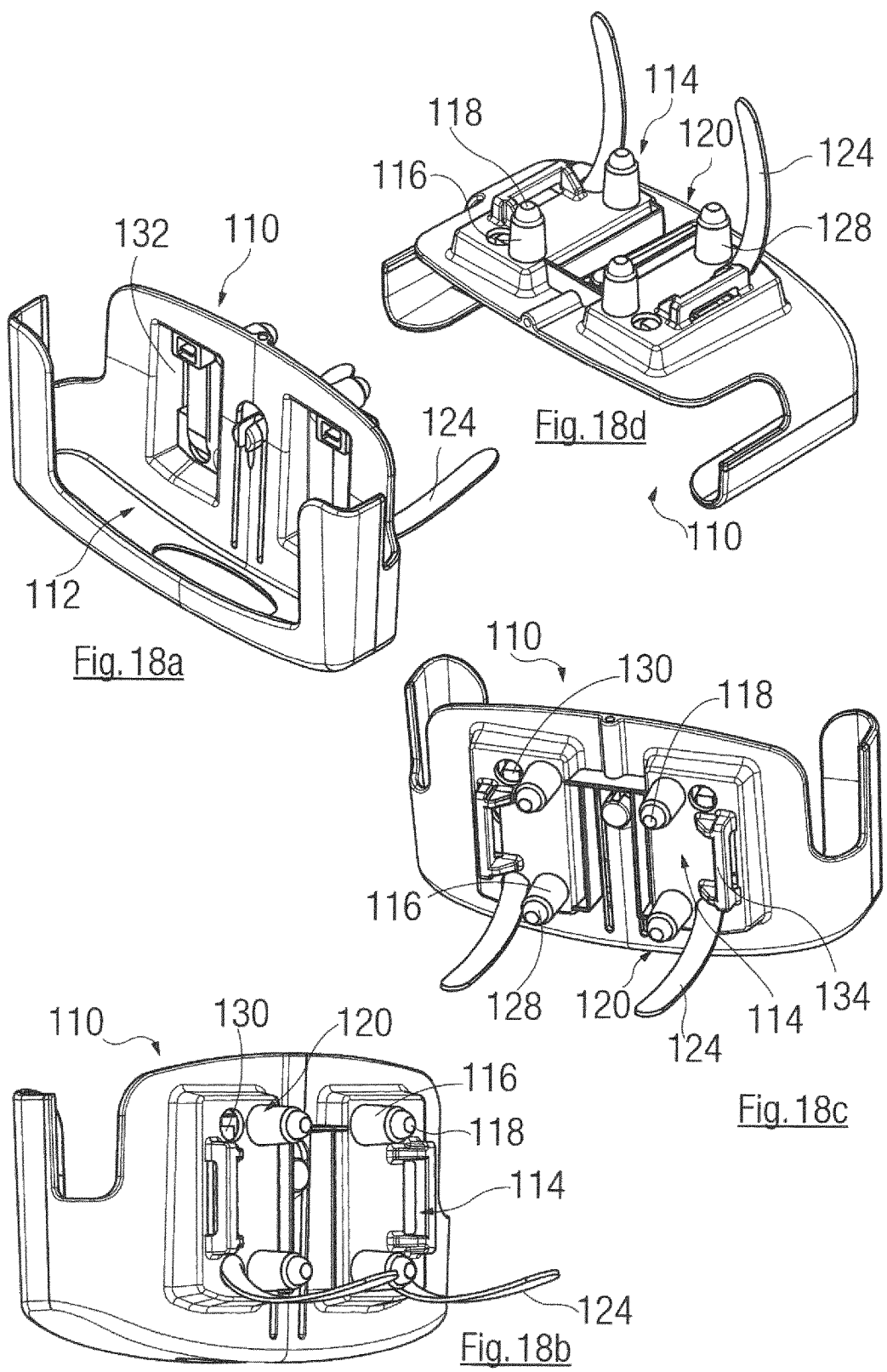

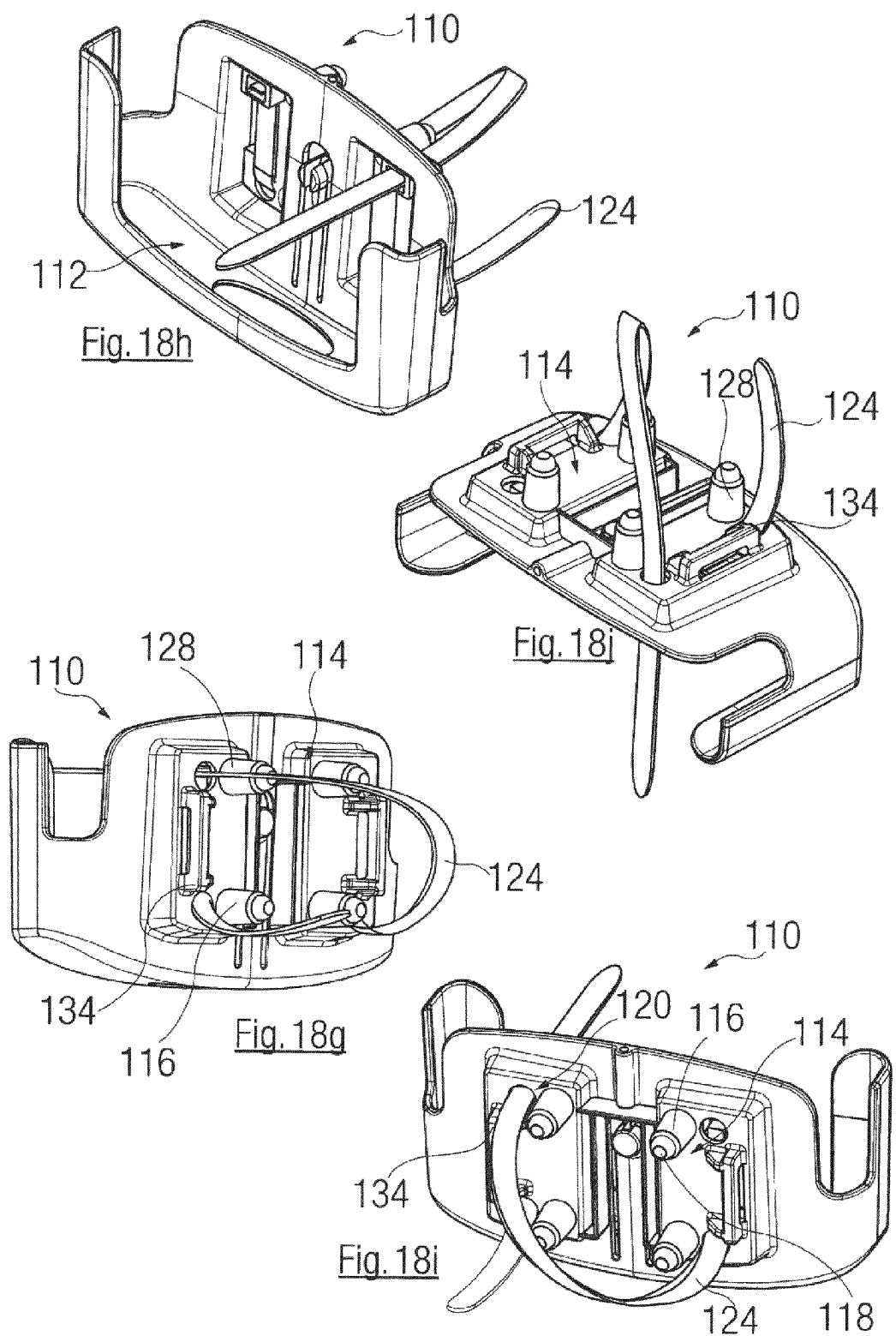

PIECE OF FITNESS EQUIPMENT

TECHNICAL FIELD

The present invention relates to a piece of fitness equipment with a carrier for carrying a pump on a body part of a person, a piece of fitness equipment with a pressure belt for applying pressure to a body part of a person, a method for controlling a piece of fitness equipment, a piece of fitness equipment with a charger for charging a pump and a piece of fitness equipment with a hanger.

BACKGROUND OF THE INVENTION

EP 1 248 586 B1 and WO 01/52787 A2 describe a piece of fitness equipment in the form of a garment that is provided with a low-pressure chamber.

Another piece of fitness equipment known from EP 1 307 168 B1 presents a training device with a rigid housing, inside which, low pressure is also producible.

It is further known from WO 03/030808 A and US 2005/0070405 A1 that a piece of fitness equipment can be formed in shape of a collar having a plurality of air chambers, which are alternatingly applied with high and low pressure. The air chambers are supplied by different inlets with air being supplied and discharged periodically.

Inflatable compresses are known from WO 04/084790 A, US 2005/0187500 A, U.S. Pat. No. 3,920,006 and US 2002/00442583 A1. However, these devices represent medical devices for wound treatment that are particularly applied in case of edemas, circulatory disorders or bone fractures.

Such training devices are comparably costly and limited in their field of application, as only a certain operating frequency can be achieved with a reasonable effort. Personal assistance can be required in this case, which is available in the fitness and leisure businesses.

SUMMARY OF THE INVENTION

An objective of the present invention is to improve a piece of fitness equipment as described above.

The piece of fitness equipment comprises a carrier for carrying a pump on a body part of a person. The carrier comprises a main body that has a first end and a second end, a fastener capable of connecting the first end and the second end, and a holder for detachably attaching the pump to the main body of the carrier.

The piece of fitness equipment is intended for increasing fat burning in a body part of a person by stimulating blood circulation within this body part. Preferably, the person's pulse is within the fat burning zone. This can be achieved, for example, by the person performing endurance training on an appropriate training device when using the device according to the invention.

The body part, to which the carrier is intended to be attached, can preferably be the torso, particularly the belly portion of the person. The main body of the carrier is, for example, formed as an elongated tape. By connecting the first end with the second end, the carrier can enclose and thereby be attached to the body part of the person so that the person can carry the pump. The pump can be attached to the main body of the carrier using the holder, so that preferably the pump is held by the carrier. The holder can be attached to main body of the carrier in a detachable or fixed manner.

It is preferred that the main body of the carrier has an inner side facing toward the body part and an outer side facing away from the body part with the holder being arranged on the inner side and preferably formed as a closable pouch.

By arranging the holder on the inner side of the main body, the pump can be carried by the person using the carrier in such a way that the pump is invisible. Furthermore, tubes, which lead away from the pump and are, for example, connected to a pressure belt, as will be described in the following, do not have to be directed around the belt. By forming the holder as a closable pouch, the pump can be quickly and easily fixed to the carrier.

It is preferred that the holder provides a first opening and a second opening with the second opening preferably being arranged opposite of the first opening.

Preferably, both of the openings are intended for establishing access to the pump. For example, a controller, such as a switch, can be operated at the pump through the first opening. Moreover, tubes leading away from the pump can be directed out of the holder through the second opening so that the holder can be closed, which itself enables the pump to be secured within the holder.

It is preferred that the main body of the carrier includes at least one strap on the inner side of the main body.

Preferably, the strap serves for holding, and thus also for directing, the tubes of the pump. Furthermore, slipping of the tubes can be avoided, which on the one hand can be found disturbing by the person and on the other hand can lead to a loosening of the tubes from the pump or from the pressure belt.

It is preferred that the main body and/or the holder and/or the strap are made of a textile and particularly a breathable material that is preferably elastic and further preferably comprises neoprene.

The main body, the holder, and the strap can be made of the same material or of different materials. If an elastic material is used, this preferably improves the mobility of the person that carries the carrier. Particularly, if the holder is made of an elastic material, the pump is securely fixable due to the elasticity of the holder, as the elastic material's tension can induce a greater holding force for holding the pump. The material "neoprene" is preferred.

It is preferred that the fastener comprises a hook tape, which is arranged on the inner side of the main body in a portion of the first end, and a loop tape, which is arranged on the outer side of the main body in a portion of the second end, with the hook tape being engageable with the loop tape for connecting the first end with the second end.

The hook tape preferably provides a plurality of hooks, especially barbed hooks or mushroom heads, which interlock with the loop tape, which preferably provides a plurality of curled strings. A hook and loop fastener is an example of such a fastener. Preferably, the loop tape extends along a prolonged portion so that the carrier can be adapted to body parts of most different sizes.

It is preferred that the main body of the carrier is provided with a further loop tape on at least a portion of the outer side of the main body.

Preferably, the further loop tape extends over a major part of the outer side of the main body and more preferably, the loop tape of the fastener is formed as a part of the loop tape at the second end of the main body.

It is preferred that the piece of fitness equipment further includes an object holder for attaching an object, particularly a media playback device, to the main body of the carrier, with the object holder being preferably made of a textile, particularly elastic, material, which preferably comprises neoprene.

The object can be, for example, an MP3 player or a cell phone. If the object holder is made of elastic material, the object can be securely fixed to the object holder by the tension produced during the object's insertion.

It is preferred that the object holder is detachably attached to the main body of the carrier with the object holder having a second hook tape for the detachable attachment to the loop tape of the carrier.

If the further loop tape of the main body of the carrier extends along a large portion of the carrier, the object holder can be attached at various locations along the carrier. Also in this case, the detachable attachment can be a hook and loop fastener between the main body and the object holder.

The invention further relates to a piece of fitness equipment that comprises a pressure belt for applying pressure to a body part of a person. The pressure belt provides at least a first pressure chamber to which a fluid can be applied, a first fitting that includes a first connecting portion and is connected with the first pressure chamber, a pump that is capable of applying the fluid to the first pressure chamber, a first tube that connects the first pressure chamber with the pump and has a first end piece, and a controller for controlling the pump, with the first connecting portion and the first end piece forming a fluid-tight, quick-release coupler and with the first fitting being bent.

The pressure belt is preferably tightly fit to the body part. The fluid is preferably a gas or a gas mixture, further preferably air. The pump can pump up the first pressure chamber with the fluid so that the first pressure chamber arches and applies pressure to the body part of the person. The pressure used therefor can be referred to as operating pressure.

The pump can be carried by means of the carrier. The carrier can be arranged on the pressure belt.

If the carrier is arranged over the pressure belt, the pressure applied to the body part can be further increased, as the pressure applied by the pressure belt can no longer be effective in a direction leading away from the body part, for example, when the pressure belt closely fits to the torso, especially the belly, of the wearer.

The application of pressure to the first pressure chamber is controlled by means of the controller. For example, a periodic application of pressure, a continuous application of pressure or an application of pressure alternating between these conditions can be effected. The pump can also discharge the fluid from the first pressure chamber.

The quick-release coupler can be, for example, a quick-release coupler of a type that is common in the field of pressure tubes. The quick-release coupler can, for example, be made of metal, whereas the first tube is foldable and/or made of plastic. Due to the bent shape of the fitting, the fitting does not protrude far from the belt, which can increase the wearing comfort of the pressure belt, as the fitting does not protrude so far into the body part. Furthermore, the bent shape of the fitting prevents the tubes from being folded just beyond the fitting, which could occur when the carrier is arranged on the pressure belt or clothing is worn above the pressure belt. Also, an accidental removal of the tubes from the pressure belt can be avoided due to the tube not extending into a direction prone to removal.

It is preferred that the pressure belt further comprises a second pressure chamber to which a fluid can be applied, a second fitting that provides a second connecting portion and is connected with the second pressure chamber, and a second tube with a second end piece for connecting the second pressure chamber with the pump. The pump is preferably capable of applying the fluid to the pressure chamber, with the second connecting portion and the second end piece forming a second fluid tight quick release coupler with the second fitting being preferably bent.

Regarding the second pressure chamber, the second fitting, the second tube, and the second connecting portion, the comments made for the corresponding first of each preferably apply. Particularly, the first and the second tube and/or the first and the second pressure chamber and/or the first and the second connecting portion can be manufactured similarly or identically.

The pump can comprise single pumps which respectively apply individual pressure to the first pressure chamber and the second pressure chamber. It is further preferred that the pump has a mobile power supply for the pump, such as a rechargeable battery. Alternatively, the pump can be attached to a hanger, as will be described later, rather than to the carrier.

It is further preferred that the chambers comprise a double-walled, sectionally flexible, fluid-impermeable shell.

The first connecting portion and the second connecting portion can be made of a metal, particularly brass, whereas the part of the fitting beyond the connecting portion can be made of plastic.

Preferably, one side of the shell is more elastic than the other side of the shell. The less elastic side of the shell thus arches less during pressure increases inside the chamber than the elastic side of the shell. The elastic side of the shell preferably faces the body of the wearer, so that the contact pressure increased by the pressure inside the chambers transmits to the body of the wearer particularly well. The more elastic side of the shell can, for example, be formed with the same but thinner material in comparison to the less elastic side. It is furthermore possible to provide the more elastic side with a material that is more elastic in comparison to the less elastic side of the shell.

It is preferred that the first fitting and/or the second fitting are substantially bent by 90°.

This represents an embodiment of the fittings which is particularly comfortable for the wearer, as the fittings protrude less from the pressure belt. Preferably, the first fitting and the second fitting are similarly formed.

It is preferred that the belt comprises a first end portion, a second end portion, and a lock, which serves for connecting the first end portion with the second end portion, and wherein preferably the lock is formed as a detachable connection and further preferably is formed as a hook and loop fastener and/or a plug fastener and/or in form of at least one push button.

If the loop portion and/or the hook portion of the hook and loop fastener expand to a large part of the pressure belt, the pressure belt is particularly well adaptable to the size of the body part. A tight fit of the pressure belt for applying pressure to the body part can be so achieved. Additionally, the pressure belt can be used for different body parts, such as the torso, especially the belly portion, the thigh, or the arm.

It is preferred that the first pressure chamber comprises a first base section, which essentially extends linearly, and at least two first branch sections, which branch off the base section. It is further preferred that the second pressure chamber comprises a second base section, which essentially extends linearly, and at least two second branch sections, which branch off the second base section, wherein preferably the second branch sections are respectively arranged between the first branch sections.

One such arrangement can be achieved by arranging the first and second base sections to extend linearly and parallel.

Particularly preferably, the base sections are provided along a peripheral edge of the pressure belt. This means, that the pressure belt itself is essentially formed elongated and that the base sections run along the both edges of the pressure belt. In a particularly preferred manner, the branch sections are arranged perpendicular to the base sections.

A preferred embodiment of the invention provides that a pump is provided, which is switchable or automatically controllable between the different chamber systems. Thus, fluid can be pumped into the different pressure chambers by a single pump.

The application of the pressure belt, particularly on travels, can be ensured in a particularly preferential embodiment by the pressure belt being wearable by means of a mobile power supply and comprising at least one pump. However, it is also possible that the pump is arranged externally. Special modes of treatment can be carried out by the provision of more than two chambers, each of which is conducted from a normal pressure condition into a higher pressure condition. The chambers each preferably comprise a double-walled, sectionally flexible, fluid-impermeable shell.

The pressure belt achieves its objective particularly well in association with movement at a pulse within the fat burning zone with each of the endurance training devices (cycle, treadmill, stepper, etc.).

Particularly, the branch sections are arranged in an interleaved arrangement.

It is preferred, that the first pressure chamber and/or the second pressure chamber are manufactured of two layers, which are preferably welded together for separating the first pressure chamber and the second pressure chamber.

This simplifies manufacturing of the pressure belt, as the two layers must only be overlapped for establishing the form and arrangement of the chamber in a following welding step. In doing so, as has been described above, the one layer can be more elastic than the other layer for achieving an enhanced effect.

It is preferred that the pump comprises a sensor which measures the pressure of the fluid in the first tube and/or in the second tube.

The sensor preferably comprises a pressure sensor that measures the pressure of the fluid in the first and/or second tube. The result of the pressure measurement is preferably transmitted to the controller, which controls the operation of the pump based on the pressure measurement of the sensor. Particularly, if the pressure measured by the sensor is higher than a pressure limit, the operation of the pump is stopped. The pressure limit preferably equals the working pressure or is higher than the working pressure by 5%, 10% or 20%.

Particularly, if the pressure inside the first and/or second tube is higher than a prescribed working pressure, this indicates an obstruction, a folding or other blockage of the first and/or second tube. In such a case, the operation of the pump is then terminated. The sensor can thus be used to indicate the accurate connection and the proper arrangement of the pressure belt, the pump, and the tubes.

It is preferred that the pump comprises a rechargeable battery and a detector that detects the state of charge of the rechargeable battery and preferably comprises a notifier for issuing a message, particularly a noise.

Preferably, the pump and the controller and/or the sensor are operated by the battery. A rechargeable or a non-rechargeable battery can be used. The detector of the state of charge detects the state of charge of the rechargeable battery, for example, by measuring voltage and current. If it is determined that the state of charge of the battery is below a lower limit value, the notifier is activated for issuing a message to the user. The message can be produced by an indicator, such as a light. Advantageously, it is useful to provide the message by a noise that is, for example, made by a speaker. This is associated with an advantage that the message indicating that the state of charge is below a certain level can also be noticed by the user while the pump is attached inside the carrier.

For controlling, particularly of a piece of fitness equipment, it is preferred to control the pump, which comprises a first valve that is connected with the first pressure chamber, a second valve that is connected with the second pressure chamber, and a compressor with the compressor being connected to the first valve and the second valve, including the following method steps:

a) opening the first valve;
    b) operating the compressor with the first valve being opened;
    c) stopping the compressor as soon as the pressure of the fluid inside the first pressure chamber reaches a prescribed pressure;
    d) opening the second valve;
    e) closing the first valve;
    f) operating the compressor with the second valve being opened;
    g) stopping the compressor as soon as the pressure of the fluid inside the second pressure chamber reaches a prescribed pressure;
    h) opening the first valve; and
    i) closing the second valve.

It is preferred that the compressor is operated between 2 and 10 seconds, preferably approximately 5 seconds, within method steps b) and f).

It is preferred that the pressure to be reached (i.e., working pressure) by the fluid in the first pressure chamber and/or in the second pressure chamber is between 0.3 bar and 0.8 bar, preferably 0.6 bar.

It is preferred that between steps c) and d), the pressure inside the first pressure chamber, as well as between steps g) and h), the pressure inside the second pressure chamber is maintained for 6 to 30 seconds, preferably for approximately 15 seconds. It is preferred that between steps d) and e) and/or between steps h) and i), a delay lasting, for example, three seconds is provided. This is associated with an advantage that pressure compensation occurs between the two pressure chambers and thus the pumping performance of the compressor is saved in the following cycle.

It is preferred that between steps b) and c) and/or between steps f) and g), the operation of the compressor is stopped, if the pressure of the fluid in the first pressure chamber and/or in the second pressure chamber reaches a first pressure limit with the operation preferably being stopped, if the prescribed pressure is not reached within a prescribed time period.

The pressure of the fluid inside the first pressure chamber and/or inside the second pressure chamber and/or inside the first tube and/or inside the second tube is particularly determined by the sensor. The operation of the pump is stopped by the controller if the pressure limit or the prescribed pressure (i.e., working pressure) is reached. The pressure limit can be at hand, if the working pressure is reached inside the first and/or second pressure chamber or if an obstruction or other blockage occurs. Thus, overstressing the pump can be avoided by the pressure limit and a control of the pressure chambers can be provided at the same time.

If the prescribed pressure (i.e., working pressure) is not reached within the prescribed time period, this indicates that a leak is at hand, for example a tube is not connected properly. In this case, the pump is stopped for avoiding unnecessary energy consumption due to the operation of the pump.

It is alternatively preferred that between steps b) and c) and/or between steps f) and g) it is determined if the pressure of the fluid inside the first pressure chamber and/or inside the second pressure chamber is within a prescribed range of values, wherein preferably the operation of the compressor is stopped if the pressure of the fluid inside the first pressure chamber and/or inside the second pressure chamber is not within the prescribed range of values.

If the pressure inside the first and/or second tube is below a certain lower pressure limit, this can indicate that the pressure belt is not properly connected with the pump, for example that a tube connecting the pump and the pressure belt is not properly attached. The upper pressure limit of the prescribed range of values is preferably the one described before.

The invention further relates to a piece of fitness equipment that comprises a charger for charging a pump that comprises a rechargeable battery and a contact portion, which is electrically connected with the battery. The charger comprises at least one port, in which the pump can be inserted, and a power source, wherein the port comprises a counter contact portion that touches the contact portion and is connected with the power source, when the pump is inserted into the port for charging the battery.

The power source is in particular a connection to an external power grid and can comprise a transformer for transforming the voltage of the external power grid into the voltage of the rechargeable battery.

The contact portion of the pump can be an externally accessible socket. If the pump is inserted into the port, the contact portion abuts against the counter contact portion and connects the battery with the power source. The counter contact portion can be a peg or a pin.

It is preferred that the charger comprises a plurality of ports which are preferably arranged one above the other. It is further preferred that the counter contact portions of the ports are each connected with a single power source.

Thus, in particular, a plurality of pumps can be charged by a charger, for which preferably only a connection and an external power grid is needed. It is also preferred that the ports are stackable one above the other so that they firmly stand on top of each other and are electrically connected with each other at the same time.

Further, the operation of the charger is particularly simple, as the pump only has to be inserted into the charger, particularly into the port. In particular, it is not necessary to connect the pump with the charger in a separate step.

It is preferred that the piece of fitness equipment further comprises a detector that is capable of detecting an ID, particularly a membership card or a bank card, wherein preferably the detector comprises a retainer that secures the pump against removal, if the ID was not detected.

The ID can be a bankcard, a membership card or the like and can be provided for every port. If the ID is card-shaped, the detector can be a card reader, which is particularly assigned to each port. If the ID is detected by the detector, the retainer can release the pump in the port so that the user can remove the pump. The retainer is preferably assigned to each port so that the removal of single pumps can be controlled individually. The retainer can be, for example, a snap fitting device.

By help from the detector and the retainer, it is possible to automatically control the release of the pumps using the charger. The ID can then serve for purposes of detection or as deposit.

It is preferred that the charger, particularly at least one port, comprises a mounting for an attachment to a wall.

The mounting can be for example an eye or a recess in the port, by which the charger can be attached to a wall. The mounting is particularly accessible through the port, so that, for example, a screw can be screwed through the mounting. The mounting can be provided at each port or at only one port of the charger. By means of a mounting, the charger can be directly attached to a wall or, if the charger is stopped, can be secured against falling over.

It is preferred that the charger further comprises a rack for attaching the carrier and/or the pressure belt.

The rack can for example be formed as a shelf or as protrusions, such as in the type of a wardrobe, for hanging up the pressure belt and/or the carrier. The rack can further comprise horizontal rods, onto which the pressure belt and or the carrier can be hung up.

The invention further relates to a piece of fitness equipment that comprises a hanger. The hanger comprises a holding portion for attaching a pump and an attachment portion for attaching the hanger to an object with the attachment portion comprising an abutting section and a fastening section.

The hanger particularly serves for attaching the pump to a device for physical exercise, such as a treadmill, an indoor cycle or a stepper. If the pressure belt is used at the same time, the pump can be attached to the device with the carrier being unnecessary in this case. The holding portion particularly serves for securing the pump and the attachment portion is attached to the device, particularly to a rod of the device. Therefore, the device or the rod can abut on the abutting section and be fastened by the fastening section. The hanger can be attached to a vertical or horizontal rod.

It is preferred that the holding portion comprises an upper half side with the upper half side being open for inserting the pump.

This means that the holding portion can be formed as a bowl that has inner dimensions corresponding to the outer dimensions of the pump, so that the pump can indeed be easily inserted but is thoroughly fixed against vibrations.

It is preferred that the abutting section comprises a base section and a contact section with the base section having at least two openings, into which the contact section is pluggable. It is further preferred that the contact section is formed as an abutting surface or at least as two abutting protrusions.

The base section particularly serves for attaching different contact sections to the hanger. As the device and particularly the rod can have most different dimensions, it is intended to adapt the attachment section to the device. Different contact sections are helpful for this. An easy exchange of the contact section is possible, as the contact section can be screwed or plugged, particularly latched, into openings of the base section. The base section preferably has four openings. Latching devices can be provided at the base section or the contact section for interconnection.

It is preferred that the contact section is formed as an abutting surface or as at least two abutting protrusions.

The abutting surface can be planar or can be provided with a round or an angular protuberance. The abutting protrusions can be rubber bungs that have an especially high friction coefficient so that a high friction results between the device and the contact section.

It is preferred that the fastening section is a bendable tape, particularly a cable tie.

A cable tie represents a particular simple and quick attachment to the device. However, any other tape that can be closed at its free ends for example by a buckle or a latching device is possible.

Concluding, it must be noted that the piece of fitness equipment, particularly the pressure belt, serves for local weight reduction by improving the skin's blood circulation during a movement at the fat burning pulse. The fat burning pulse usually is about 60% to 70% of the maximum pulse frequency of the exercising person. At this zone, the body essentially receives its energy from the intramuscular fat and from the free blood fat. The burning pulse thus particularly depends on the sex and on the age of the exercising person. Thus, a female person in the age of 25 years usually has a fat burning pulse between 121 and 141 heart beats per minute.

The piece of fitness equipment, particularly the pressure belt, can also be used as a massage device.

BRIEF DESCRIPTION OF THE DRAWING FIGURES

Figure 2:
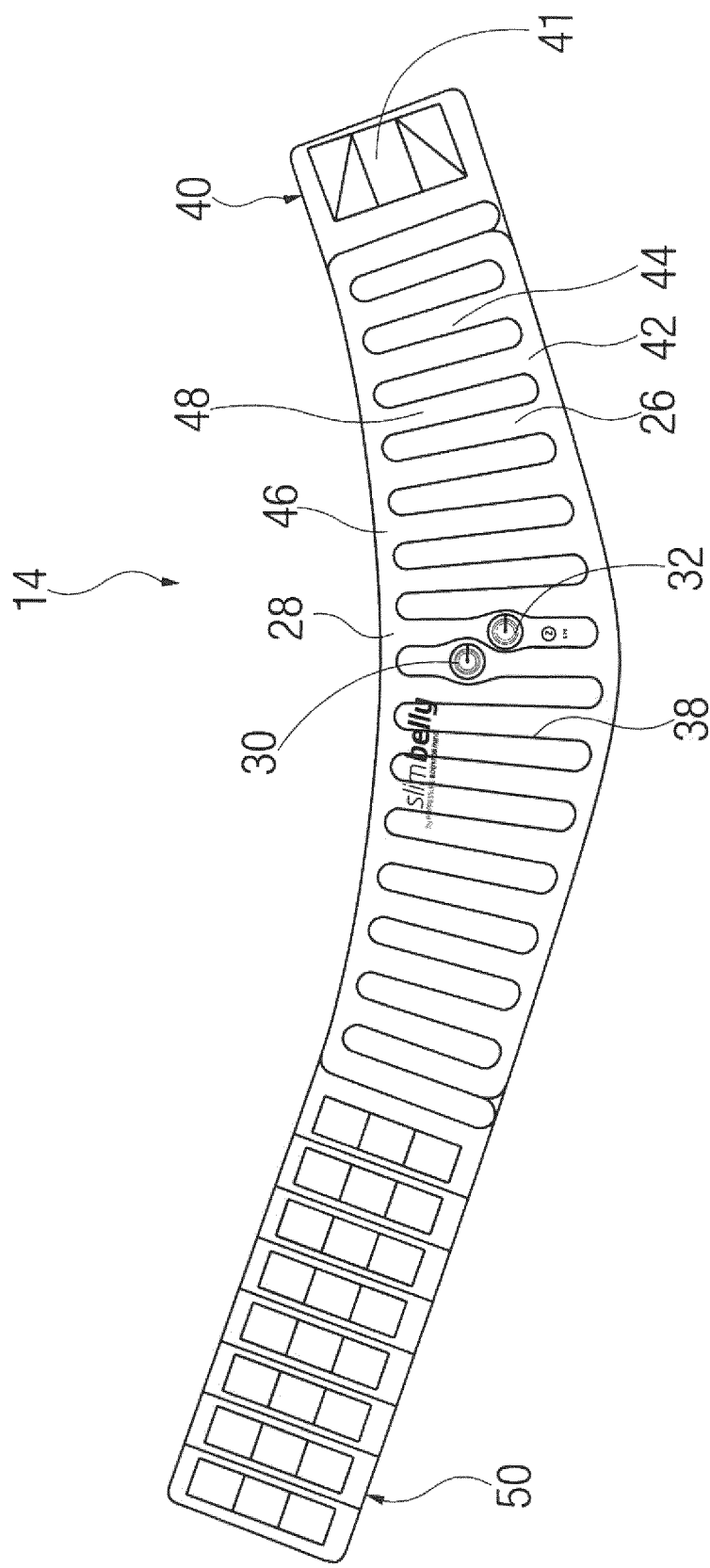
Figure 3:
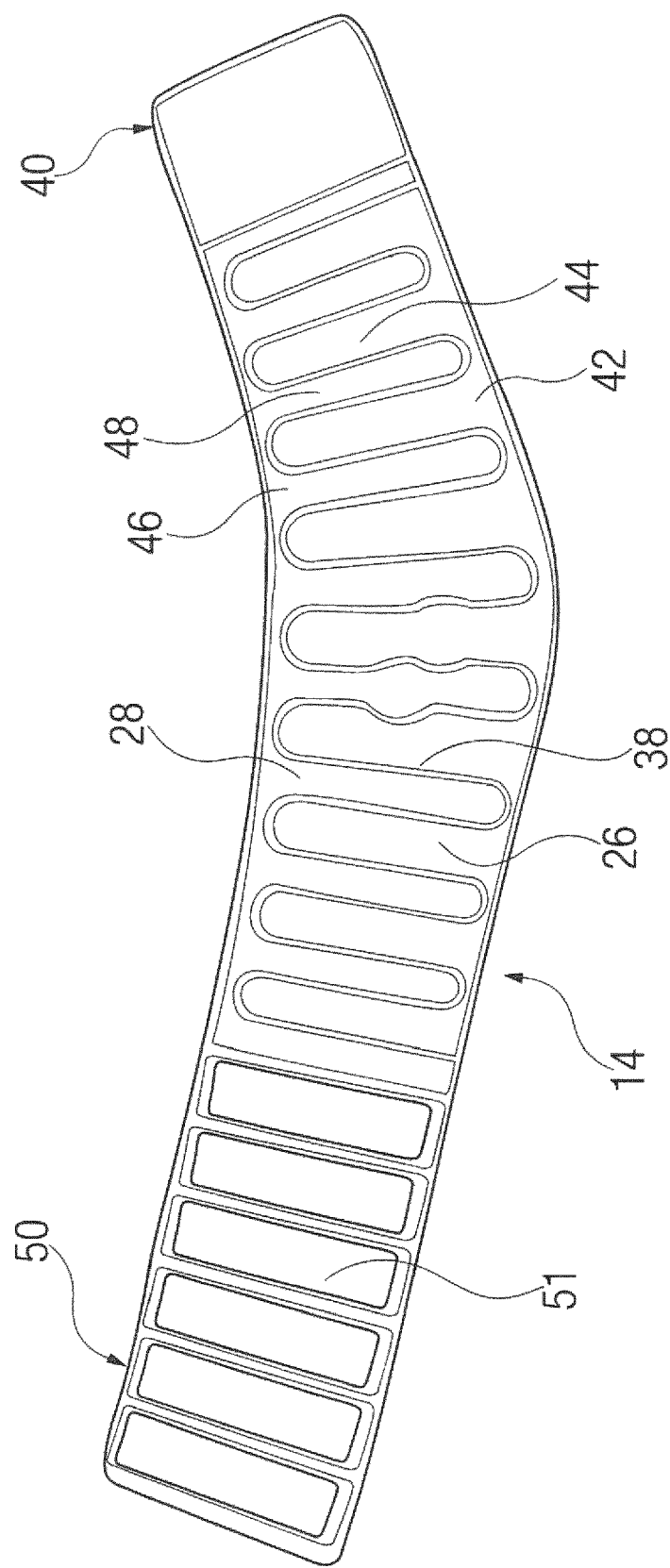
Figure 4:
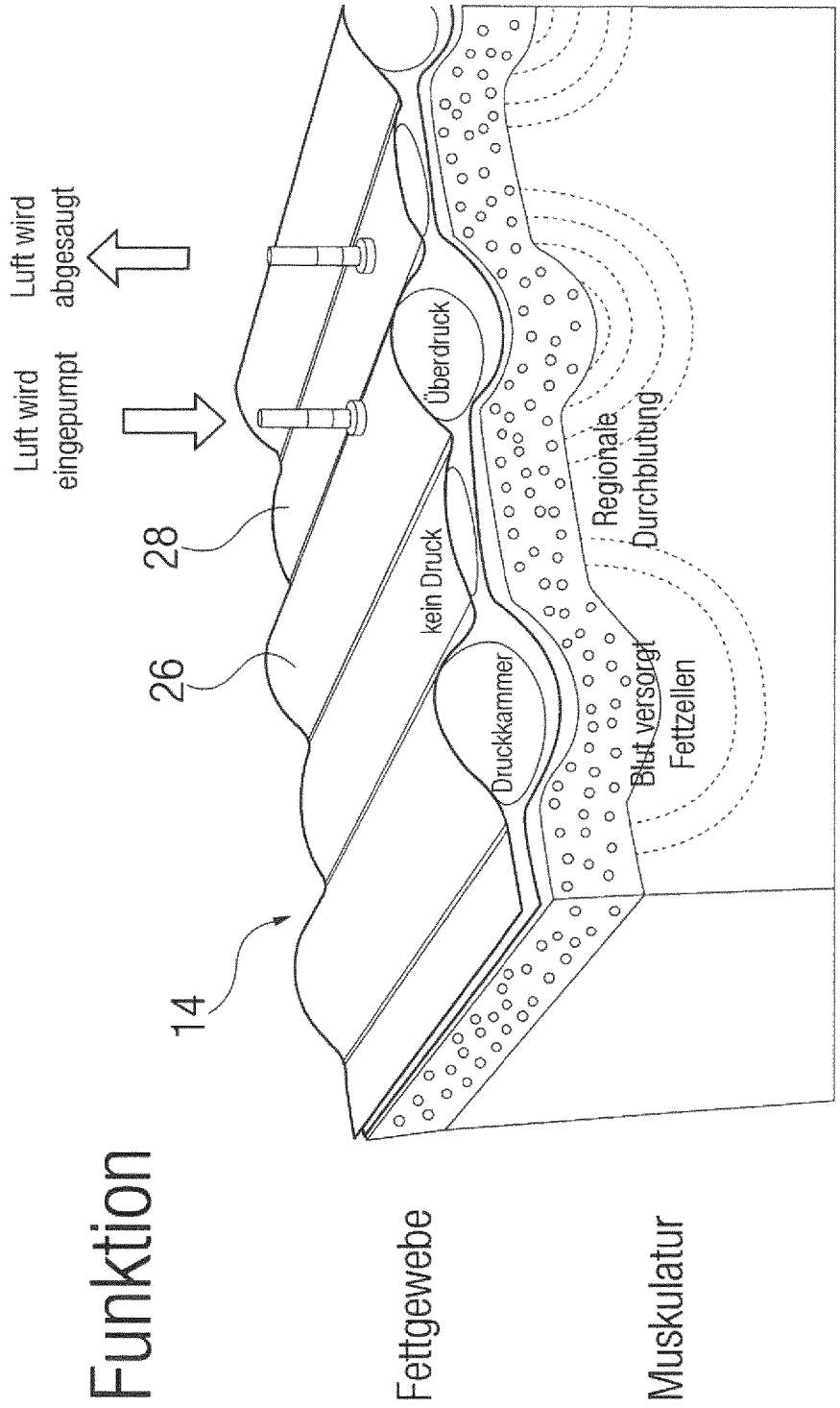
Figure 5:
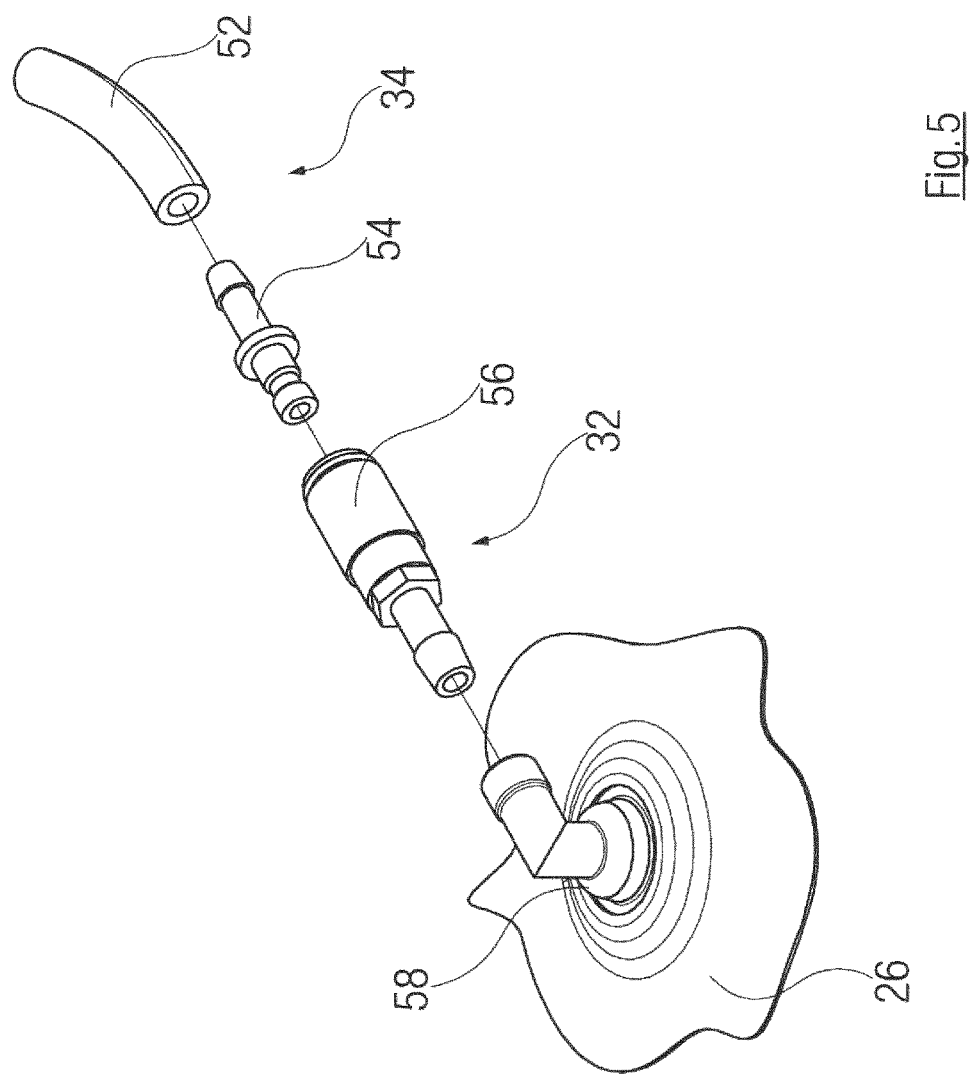
Figure 6:
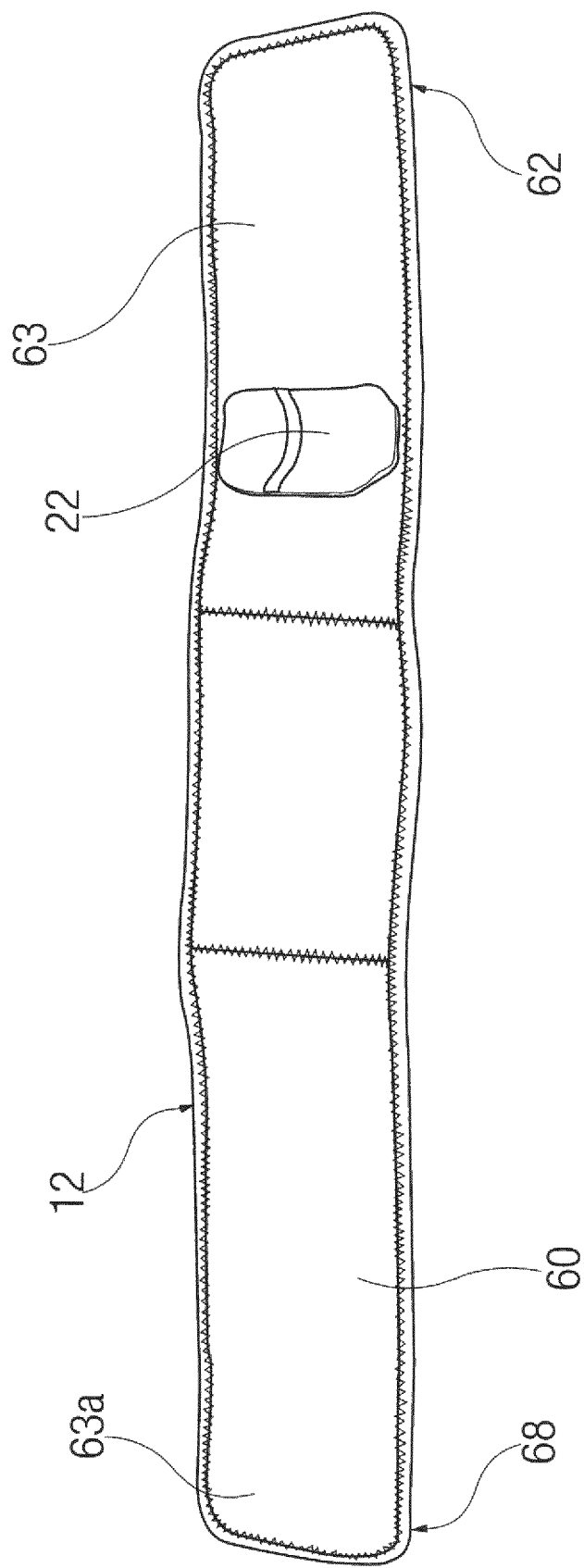
Figure 7:
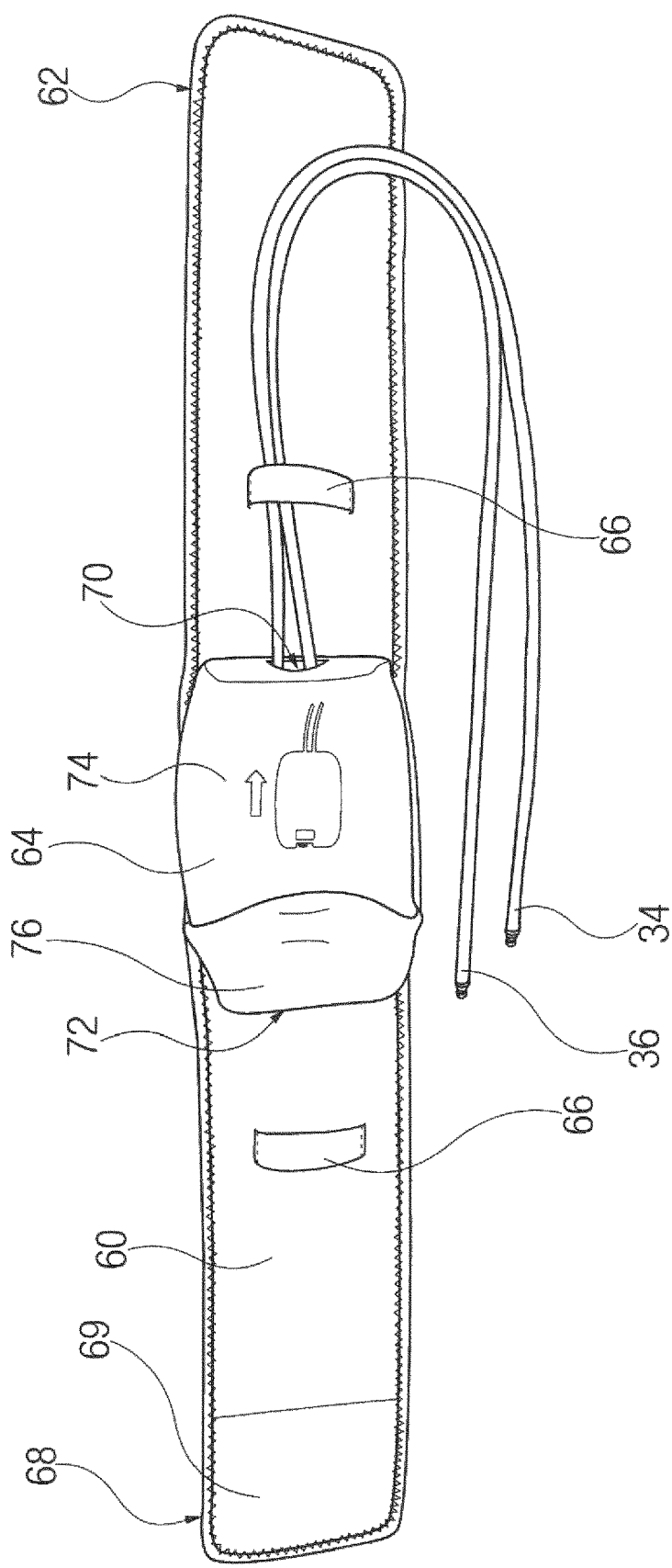
Figure 8:
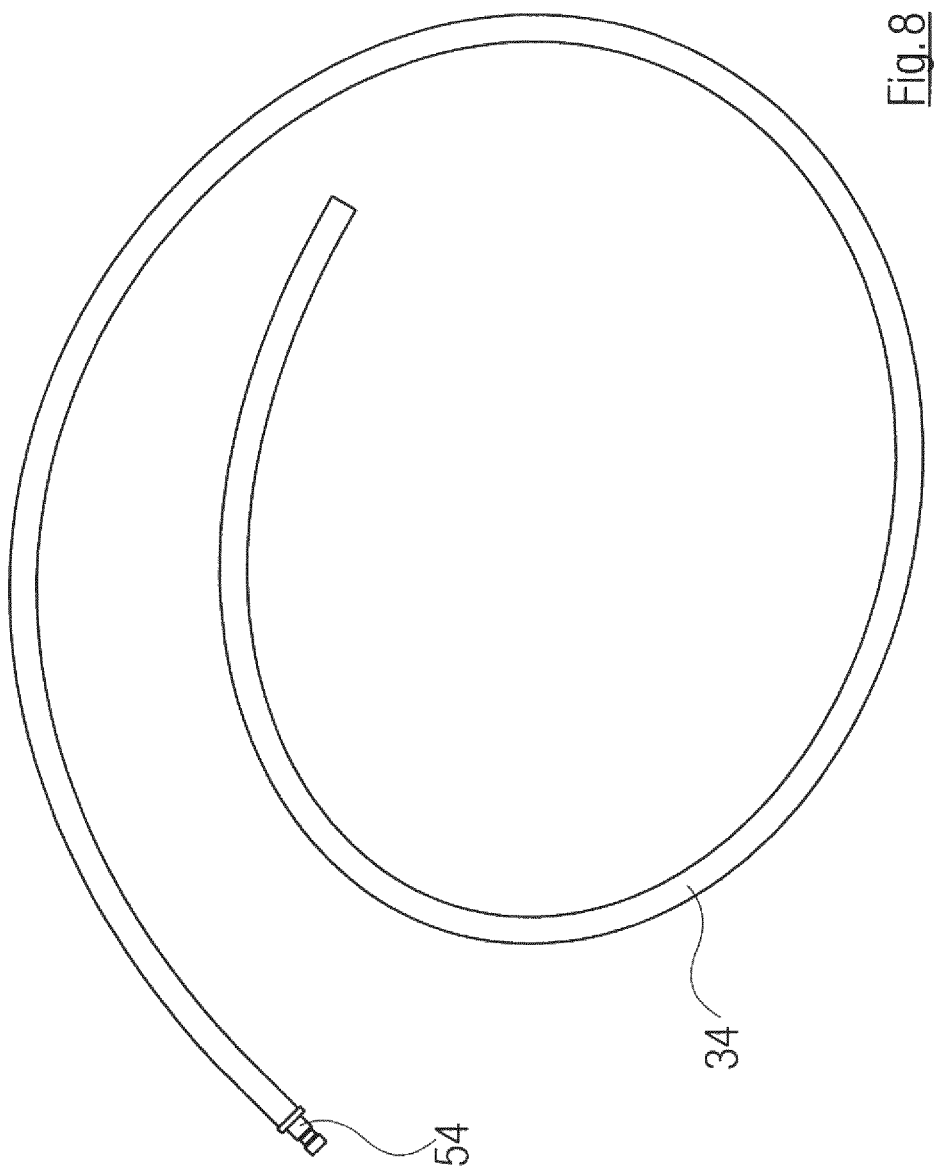
Figure 9:
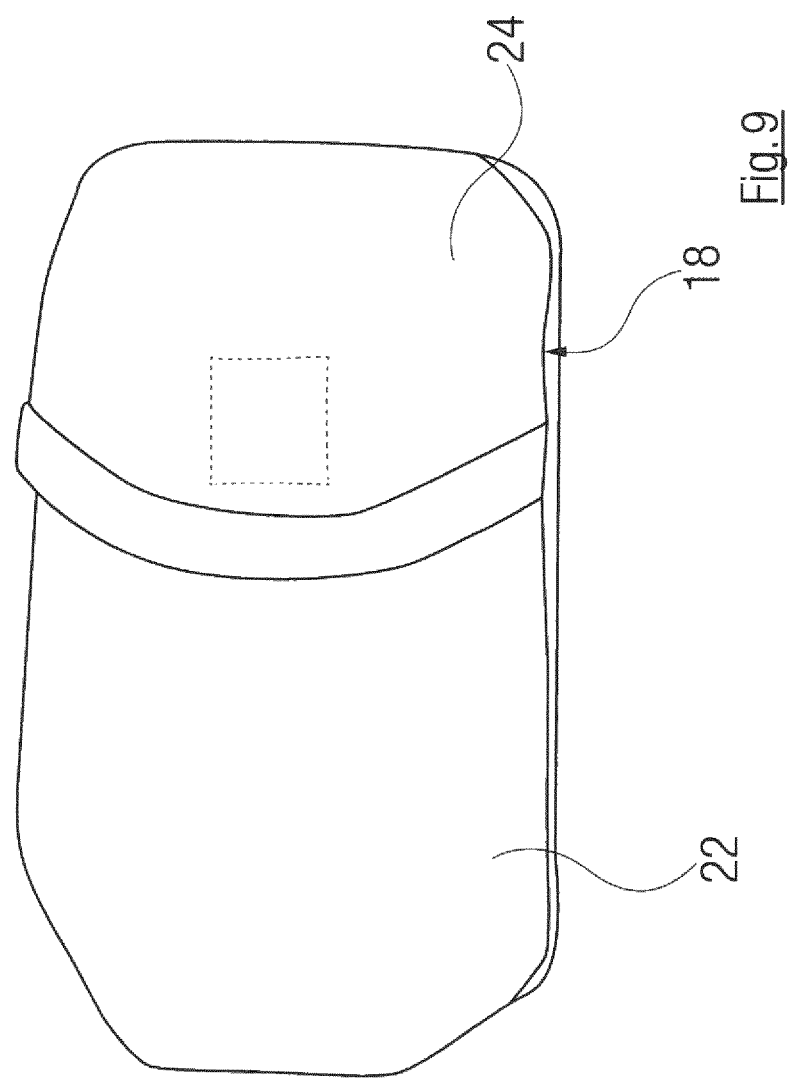
Figure 10:
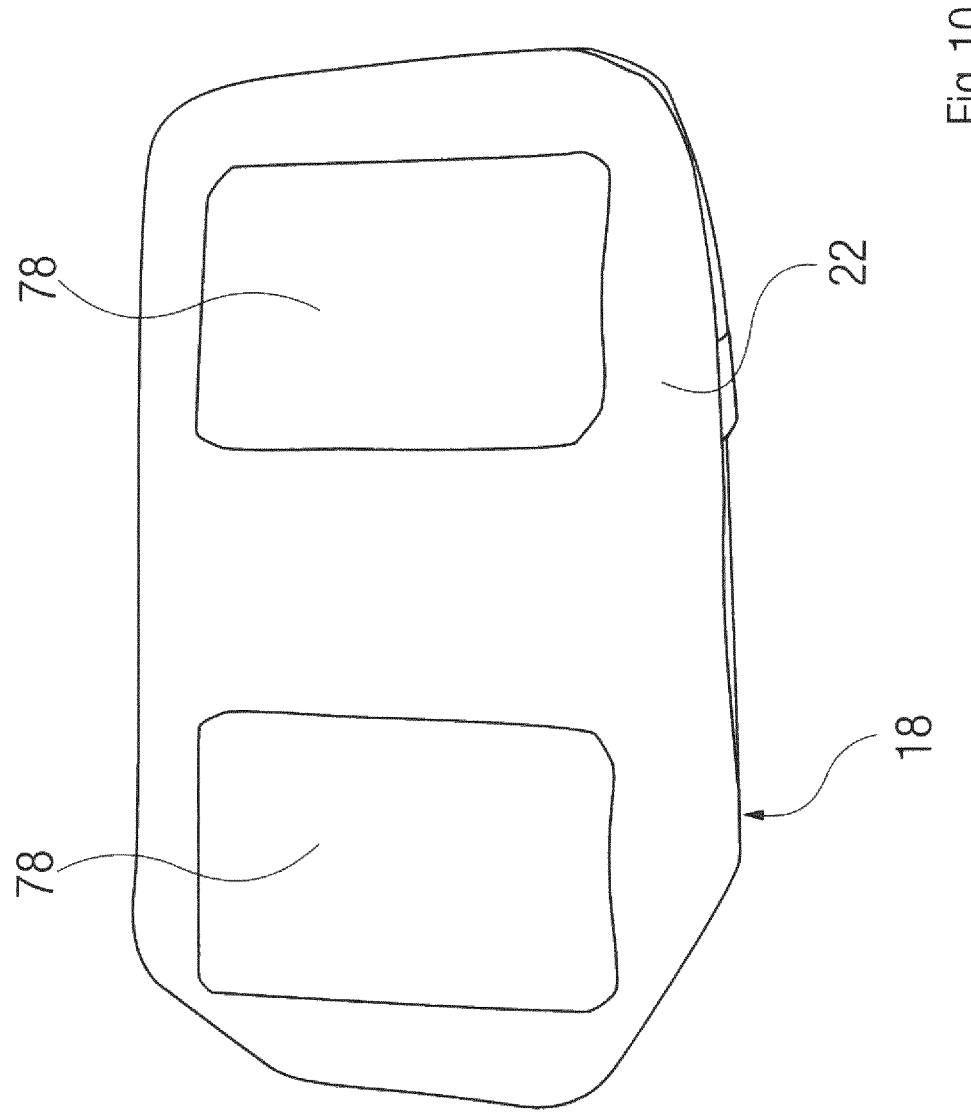
Figure 12A:
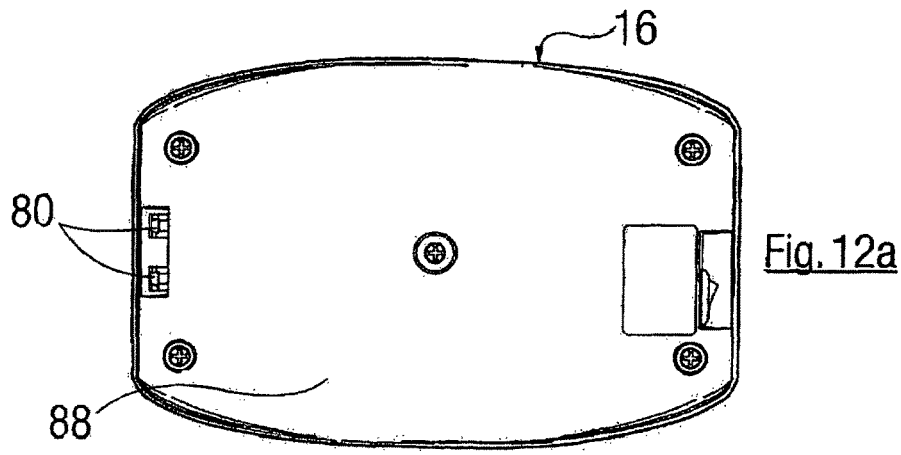
Figure 12B:
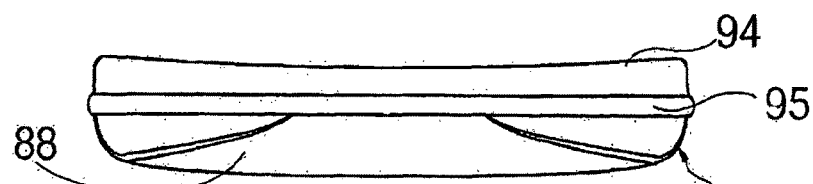
Figures 12C, 12E, 12F:
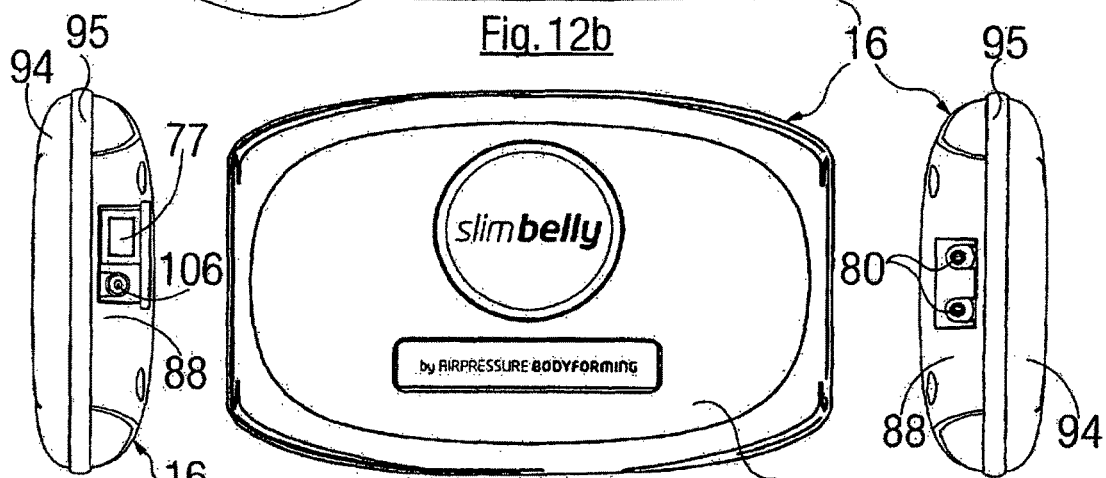
Figure 12G:
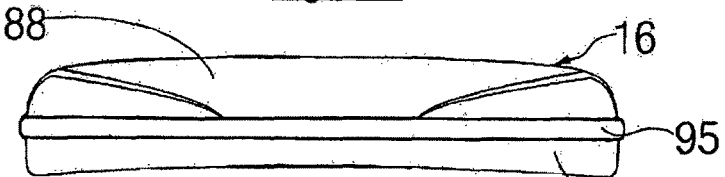
Figure 13:
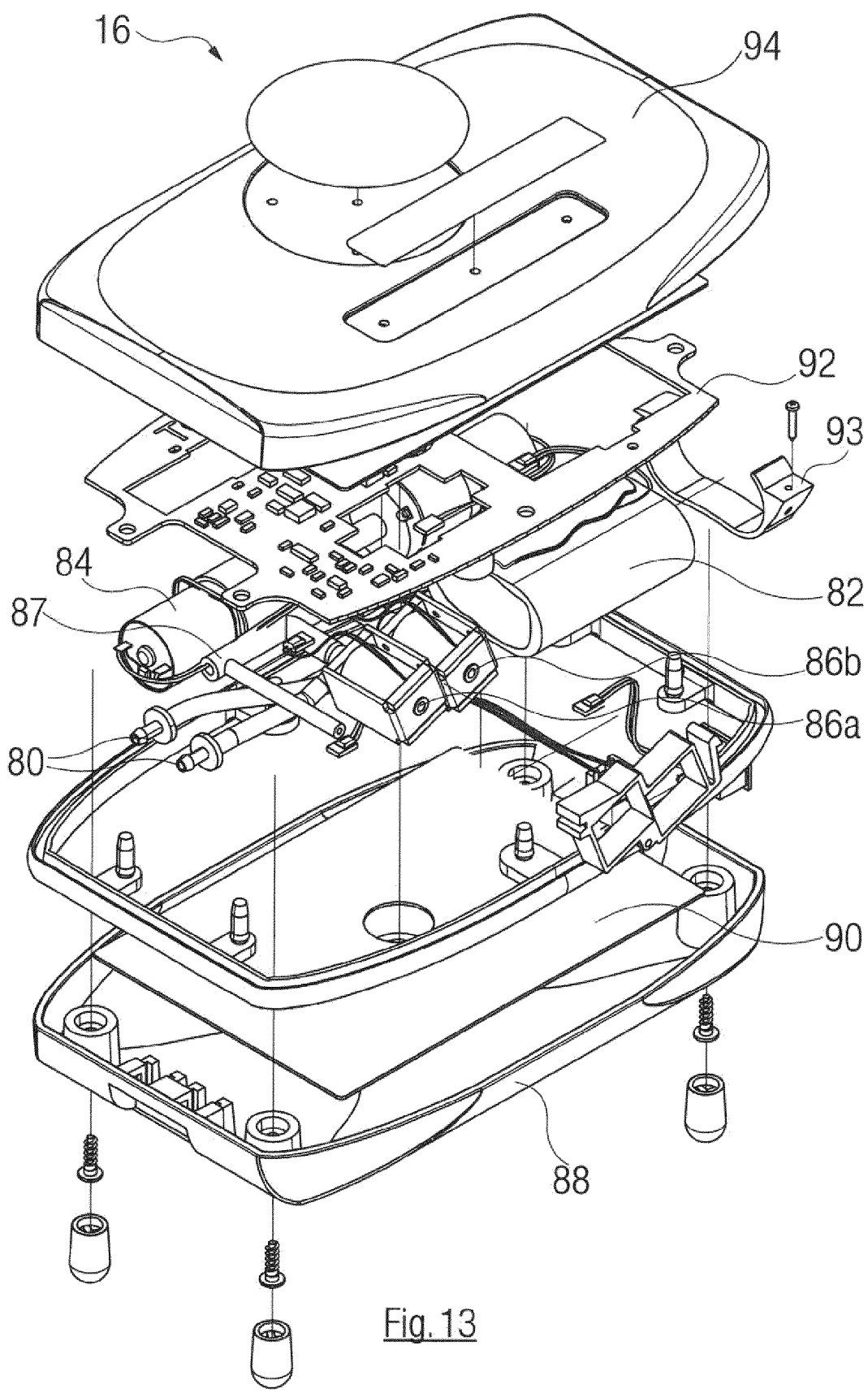
Figure 15C:
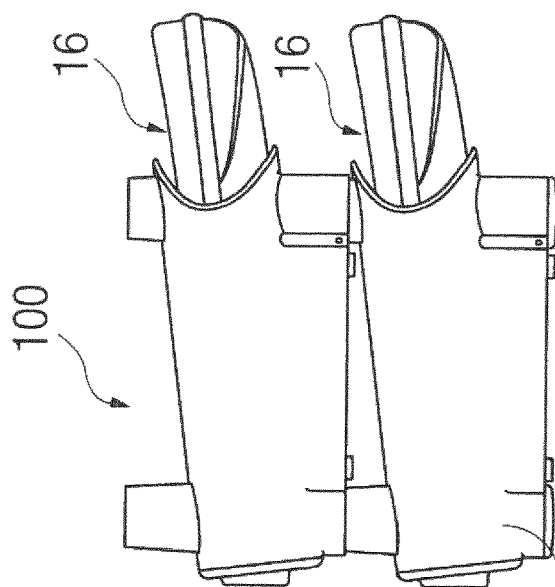
Figure 15A:
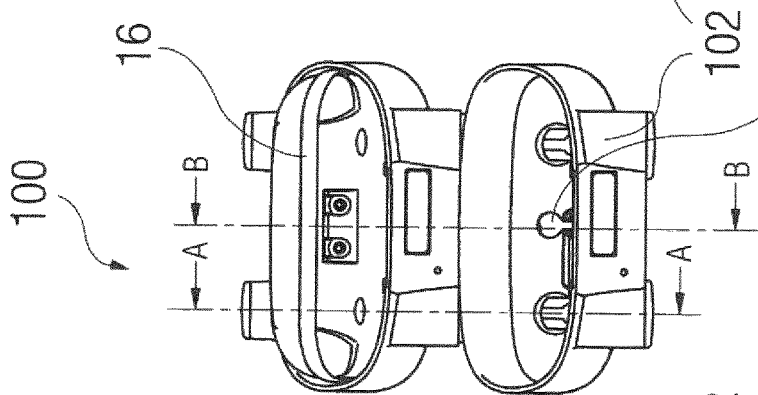
Figure 15B:
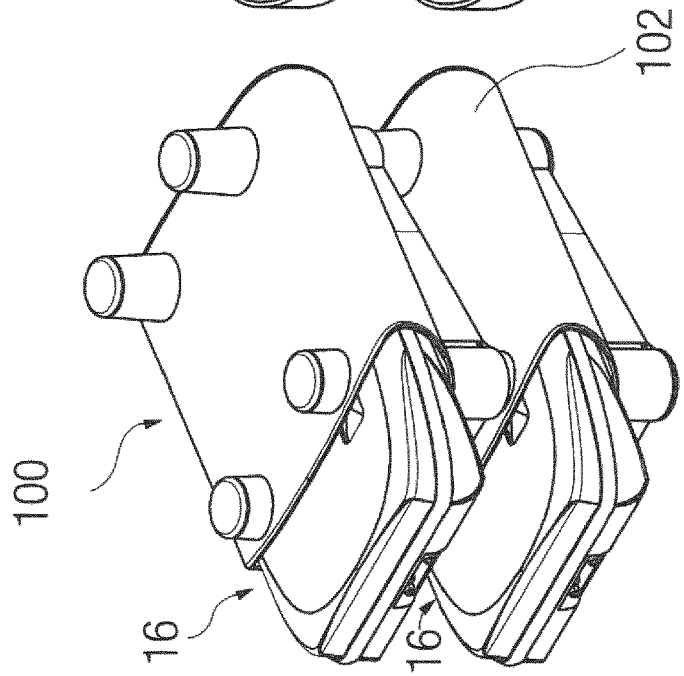
Figure 18E:
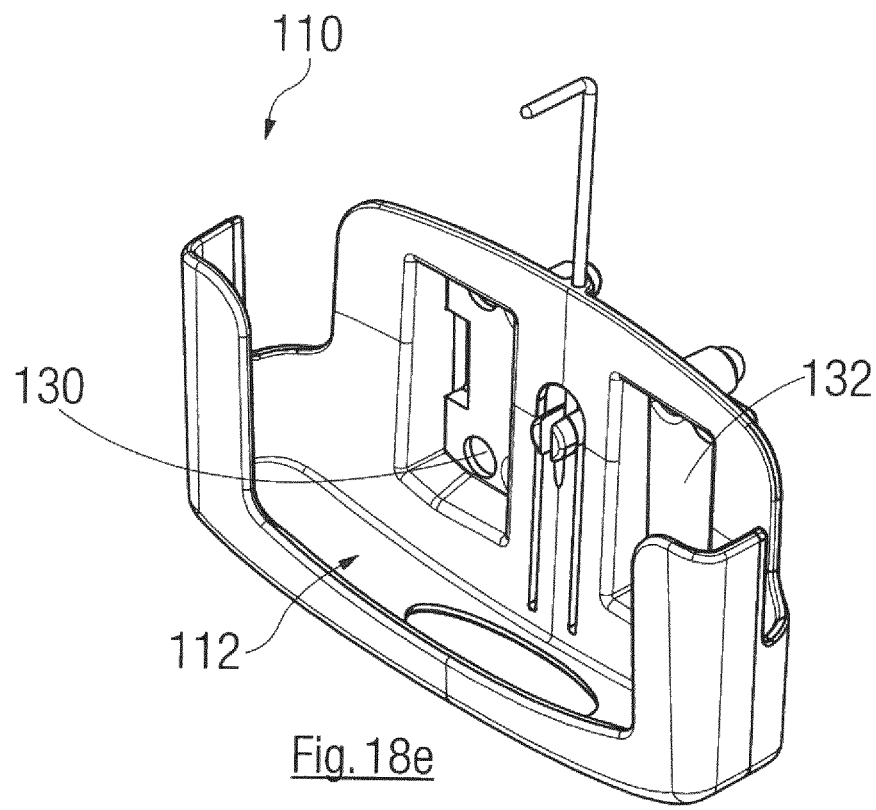
Figure 18F:
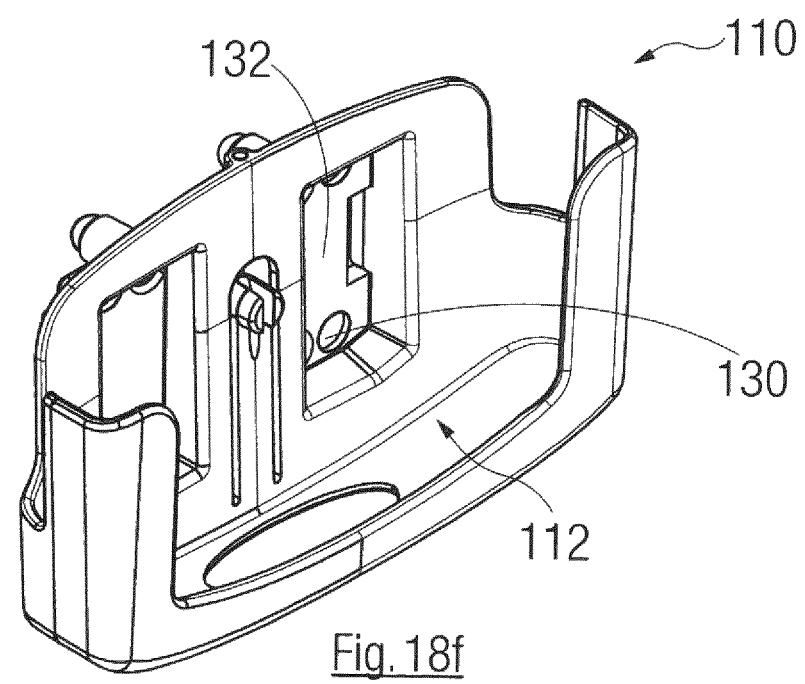
Figures 18K, 18L:
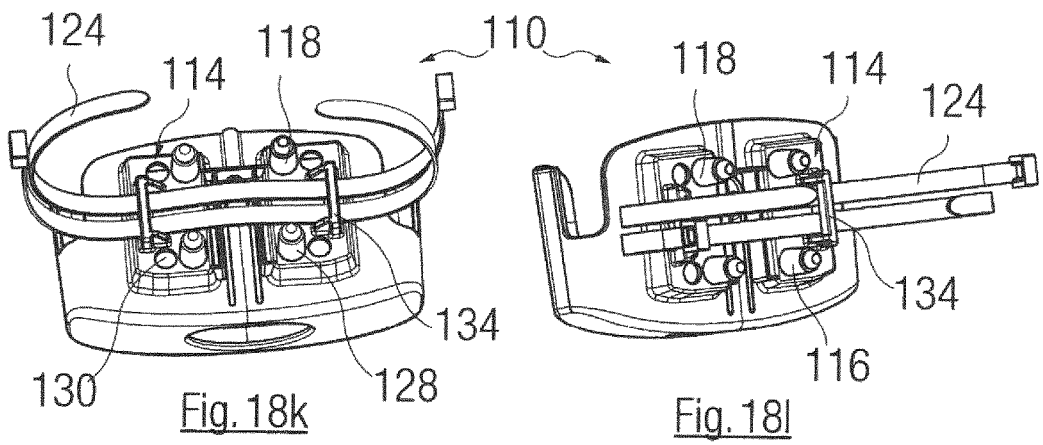
Figures 18M, 18N:
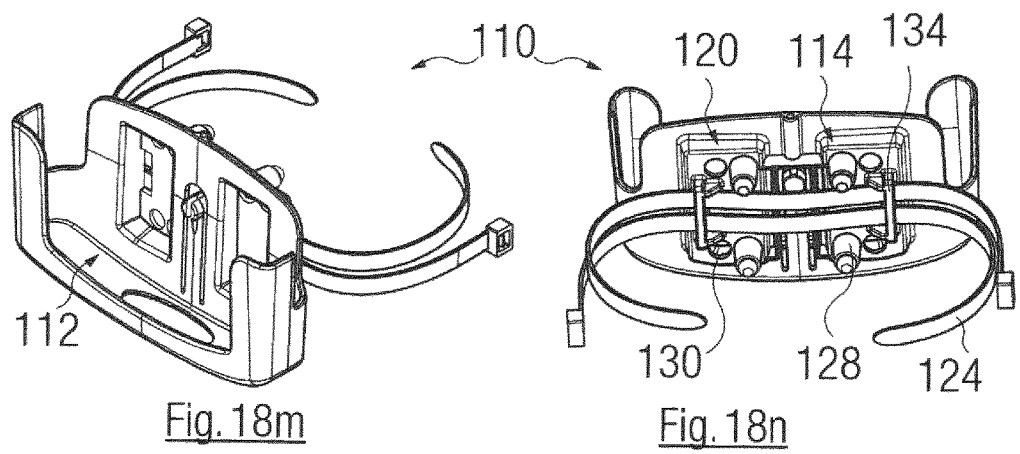
Figures 18O, 18P:
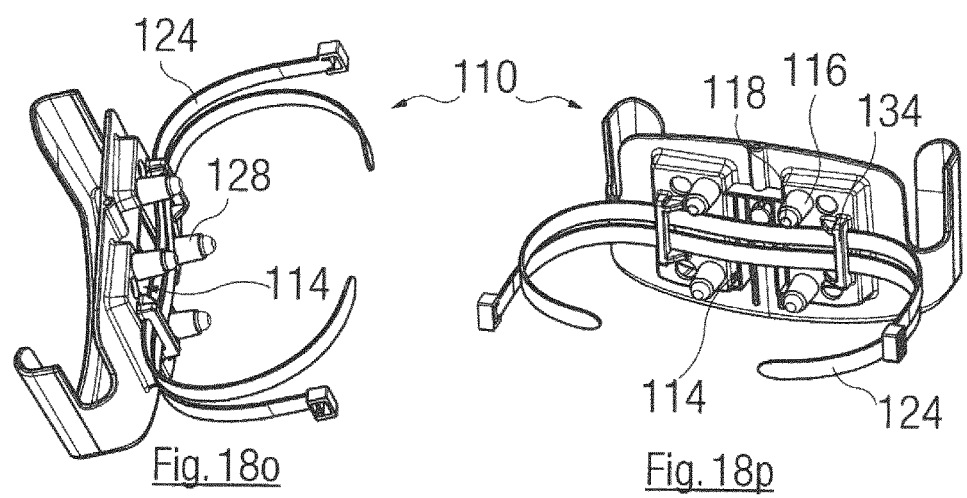
Figure 19A:
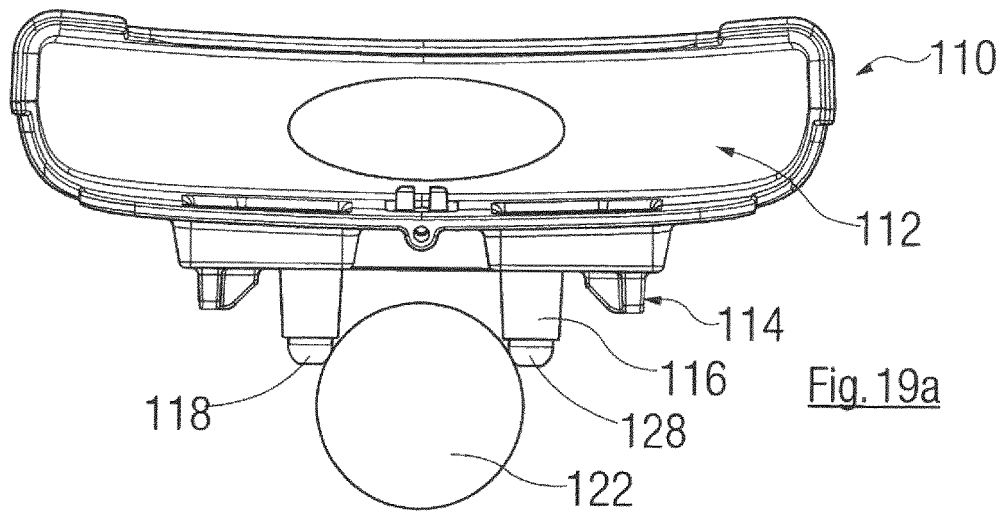
Figure 19B:
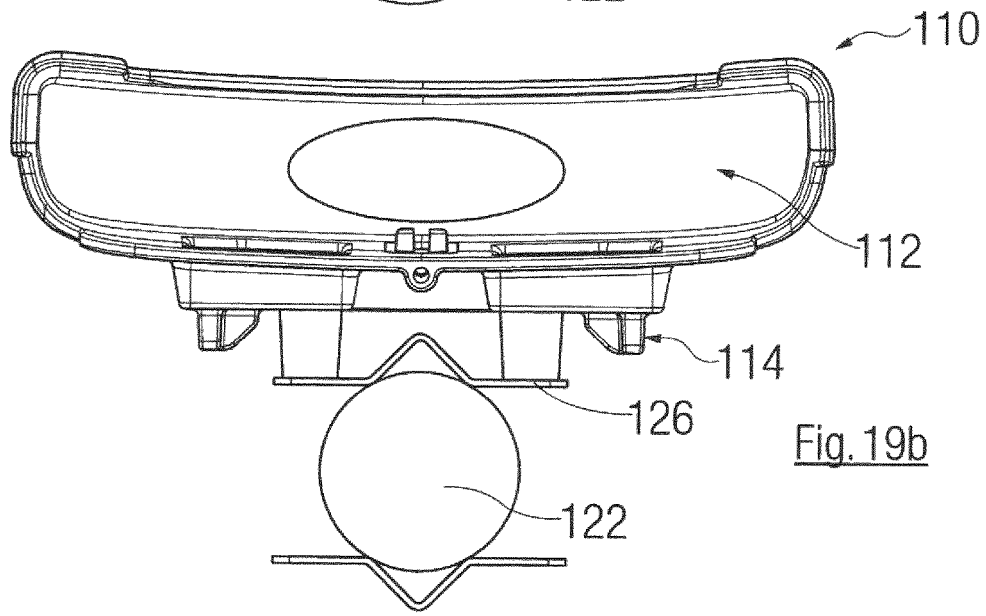
Figure 19C:
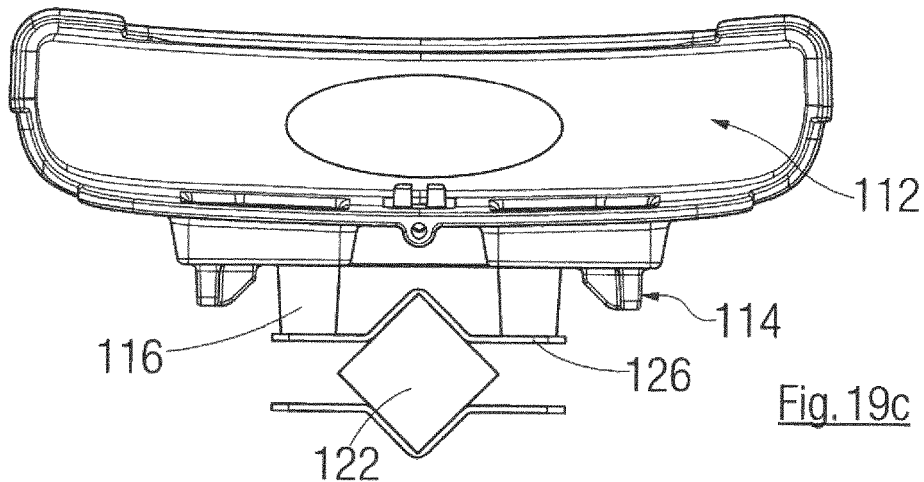
Figure 20A:
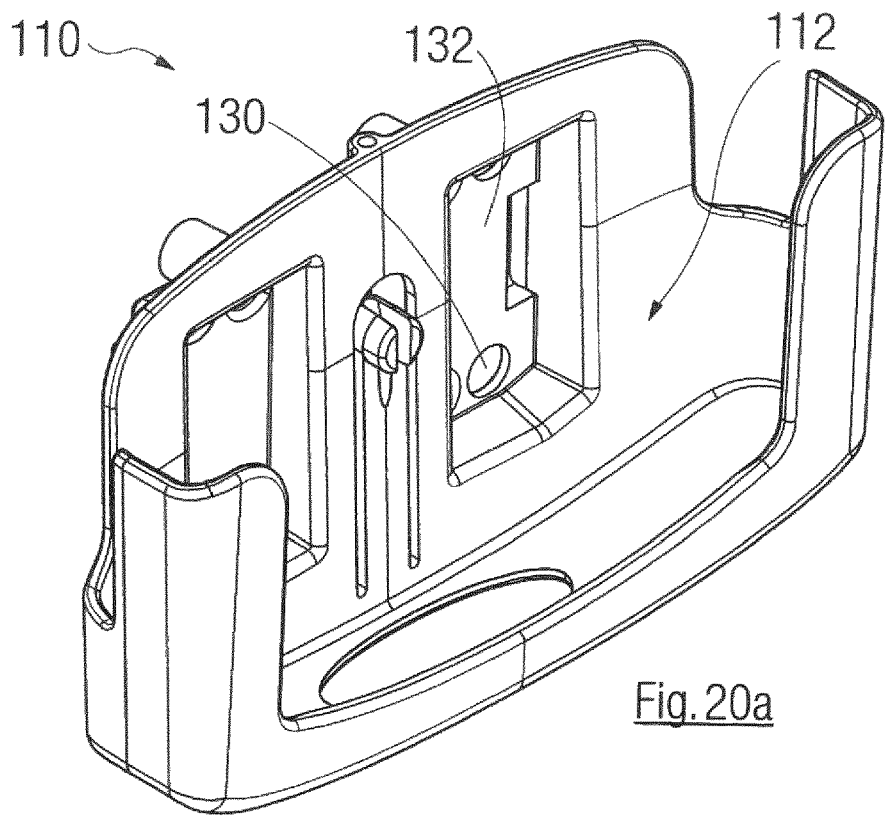
Figure 20B:
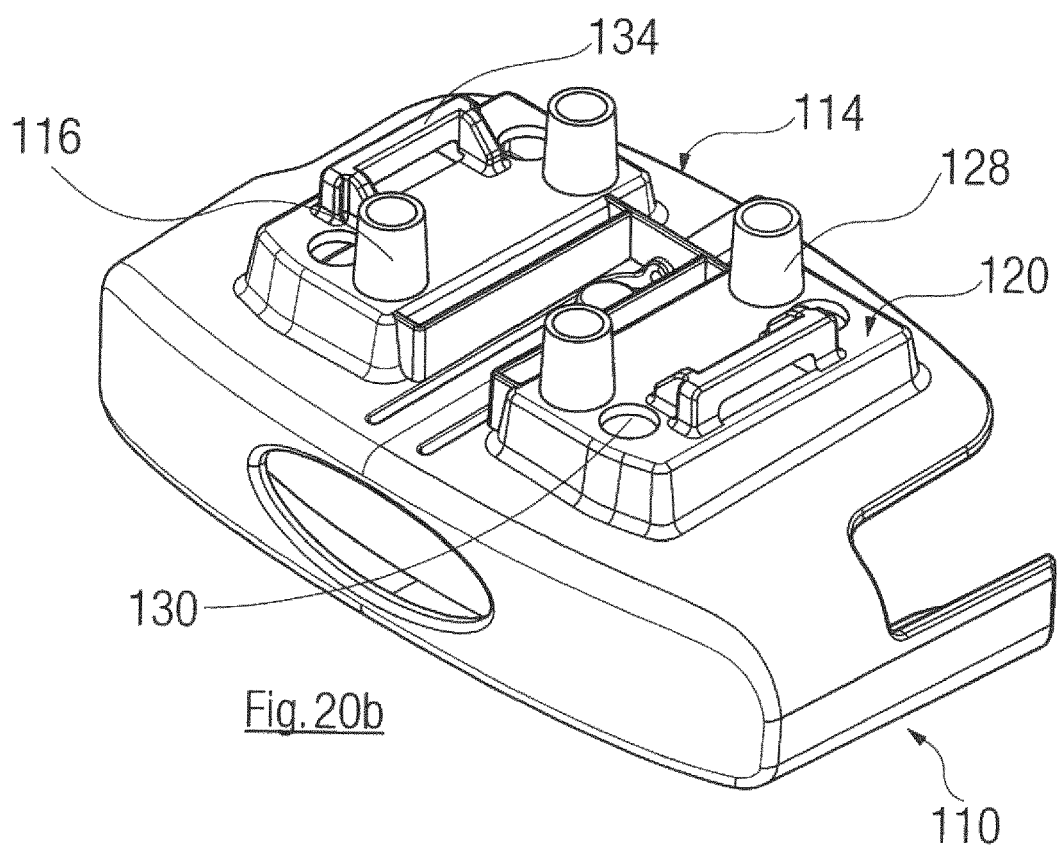
Figure 21:
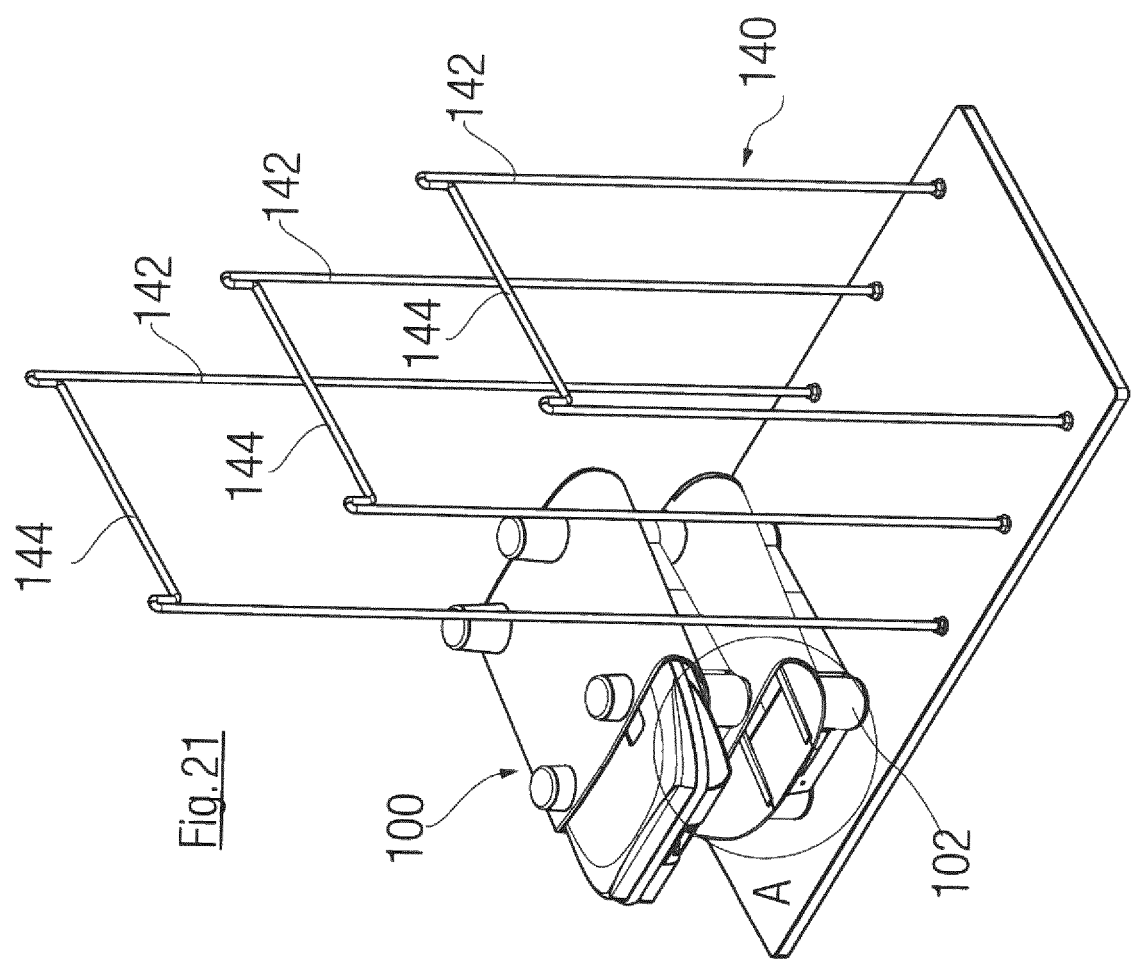

Further features and advantages of the piece of fitness equipment according to the invention result from the examples for embodiments described in the following. In the drawings representing the examples for embodiments only schematically, it is in detail illustrated:

FIG. 1 a fitness arrangement;
FIG. 2 an outer side of the pressure belt;
FIG. 3 an inner side of the pressure belt;
FIG. 4 a schematic representation of the functioning of the pressure belt;
FIG. 5 an exploded view of a connecting portion;
FIG. 6 an outer side of the carrier;
FIG. 7 an inner side of the carrier with a pump;
FIG. 8 a tube;
FIG. 9 a front side of the holder;
FIG. 10 a back side of the holder;
FIG. 11 a perspective view of the pump with two tubes;
FIG. 12a-12g most different views of the pump;
FIG. 13 an exploded view of the pump;
FIG. 14 an inner part of the pump;
FIG. 15a-15c different views of a charger;
FIG. 16a-16b sections through the charger as indicated in FIG. 15a;
FIG. 17 an enlarged illustration of a contact surface and a contact peg;
FIG. 18a-18p different perspective views of a hanger;
FIG. 19a-19c top view of the hanger;
FIG. 20a-20b further perspective views of the hanger;
FIG. 21 a charger with a rack and
FIG. 22 an enlarged part from FIG. 21 showing a detector.

DETAILED DESCRIPTION OF THE INVENTION

FIG. 1 shows a piece of fitness equipment 10 with a carrier 12, a pressure belt 14, a pump 16, and an object holder 18. An object 20, in this case an MP3 player, is arranged inside the object holder 18. The object holder 18 has a pouch 22 and a lid 24. The lid 24 is connected with the pouch 22 at the back side of the object holder 18 whereas at the front side, a hook and loop fastener establishes a connection between the pouch 22 and the lid 24. The object 20 is entirely enclosed by the object holder 18 when the lid 24 is closed.

The pressure belt 14 has a first pressure chamber 26 and a second pressure chamber 28. The first pressure chamber 26 is connected with a first fitting 30. The second pressure chamber 28 is connected with a second fitting 32. A first tube 34 and a second tube 36 are associated with the pump 16. As can easily be seen from FIG. 1, the pressure belt 14 contains two layers that are connected with each other by welds 38.

The first fitting 30 and the second fitting 32 are bent by 90°. The pressure belt 14 has, at an outer side at a first end portion 40, a hook portion 41 for a hook and loop fastener, as can be seen in FIG. 2. The first pressure chamber 26 extends to more than 50 percent of the length of the pressure belt 14 and has a first base section 42 and first branch sections 44, which essentially lead away perpendicular from the base section 42. The second pressure chamber 28 has a second base section 46, from which second branch sections 48 lead away perpendicular. The first and second branch sections 44, 48 are interleaved.

At the inner side of the pressure belt 14 shown in FIG. 3, loop portions 51 are arranged at the opposite second end portion 50 for the hook and loop fastener.

In FIG. 4, the arrangement of the pressure belt 14 to the body part of the person is illustrated. If now the first pressure chamber 26 is pumped by the pump 16 and at the same time air is sucked out of the second pressure chamber 28 or no pressure is applied to it, pressure is applied to some portions of the body part and no pressure is applied to other portions of the body part. By alternating pumping and discharging of the first pressure chamber 26 and second pressure chamber 28, the blood circulation can be stimulated. Most different pumping cycles are conceivable for the first pressure chamber 26 and second pressure chamber 28, which particularly differ by the time period and frequency of the appliance of pressure to the body part.

As is illustrated in FIG. 5, the first tube 34 has a hose 52 of a bendable plastic and a first end piece 54 of metal. The end piece 54 is non-detachably plugged into the hose 52. The first fitting 32 has a first connecting portion 56, which is made of metal. The first fitting 32 further has an angle piece 58, which is made of plastic. The angle piece 58 is bent by a 90°-angle and connected in a fluid-tight manner the first pressure chamber 26. The first connecting portion 56 is non-detachably plugged into the angle piece 58. For connection of the first tube 34 with the fitting 32, the first end piece 54 is plugged into the first connecting portion 56 in order to form a fluid-tight plug fastener.

FIG. 6 shows an outer side of the carrier 12. The pouch 22 is attached to the carrier 12. The pouch 22 is represented in a closed state. The carrier 12 comprises a main body 60 that is provided with a loop tape, except for a middle section at the outer side. A loop tape 63 is particularly provided at a second end 62 of the main body 60. A further loop tape 63a is provided at a first end 68 and at the middle section. Hook tape 69 and loop tape 63 as well as a further loop tape 63a together form a fastener.

As can be recognized from FIG. 7, the main body 60 has a holder 64 and two straps 66 at its inner side. The hook tape 69 is provided at the first side 68 of the main body 60. The holder 64 comprises a first opening 70 and a second opening 72, wherein the first tube 34 and the second tube 36 can be led out of the holder 64 through the first opening 70. A switch 77 of the pump 16 can be operated through the second opening 72. The straps 66 serve for holding and leading the first tube 34 and the second tube 36.

The holder 64 is firmly attached to the main body 60 and formed as a pocket 74. The pocket 74 has a lock 76 for closing the pocket 74. As can be well recognized in FIG. 8, the first tube 34 and the second tube 36 each comprise an end piece 54 in form of a plug for the fittings 30, 32.

As is well illustrated in FIG. 10, the object holder 18 has at its back side two hook tapes 78 at the pouch 22, by which the object holder 18 can be attached to the loop tape 63a of the main body 60.

FIGS. 12a to 12g show each side views of the pump 16. The pump 16 has two connections 80 and a switch 77. The first tube 34 and the second tube 36 are connected with the connections 80. As can be well seen in FIGS. 13 and 14, the pump 16 has a battery 82, two compressors 84, which are in fluid connection with a first valve 86a and a second valve 86b via tubes 87. The compressors 84 are connected with the connections 80 via the tubes 87 with the valves 86a, 86b opening or closing the single connections 80. Furthermore, the pump 16 comprises a bottom plate 88, a damping layer 90, a circuit board 92 and a lid 94. The circuit board 92 carries the compressors 84, the battery 82 and the valves 86a and 86b, as is recognizable in FIG. 14. Therefore, brackets 93 and/or a cable tie is used. The circuit board 92 is supported in a circumferential frame 95 of soft plastic, recognizable in FIG. 12, which itself is clamped between the bottom plate 88 and the lid 94. Additionally, a damping layer 90 of neoprene is laid in the bottom plate 88 as well as in the lid 94 for achieving a further sound damping.

As is recognizable in FIG. 14, the pump 16 further comprises a sensor 96 that measures the pressure of the fluid inside the first tube 34 and inside the second tube 36. The sensor 96 is connected with the controller 99 for terminating the operation of the pump 16 if the pressure measured inside the first tube 34 and the second tube 36 reaches a pressure limit or the pressure limit is not reached within a prescribed time period. The controller 99 can be arranged on the circuit board 92 as a separate part. Alternatively, the controller 99 can be provided by the circuit board 92 itself.

As can also be recognized from FIG. 14, the pump 16 further comprises a detector 97 for detecting the state of charge that measures the state of charge of the battery 82. If the state of charge of the battery 82 is below a prescribed value, a signal is given to a notifier 98, which is a speaker in the shown embodiment. This one then makes a buzzing noise.

As can be seen in FIGS. 15a to 15c, a charger 100 has two ports 102 with a pump 16 being inserted into each of them. The port 102 is sloped to a horizontal so that the pump 16 cannot slip out of the port 102. The ports 102 are arranged one above the other. A counter contact portion 104 in form of a pin is provided in the port 102, as can be seen in FIG. 15a. The counter contact portion 104 touches a contact portion 106 of the pump 16, which is recognizable in FIGS. 12d and 12e in form of a socket. The contact portion 106 and the counter contact portion 104 are made of metal and establish an electrical connection between a charger not shown and the battery 82 of the pump 16.

FIG. 17 establishes the electrical connection between the single ports 102. Therefore, the port 102 comprises a contact surface 105 on the lower side and a contact peg 107 on the upper side that touch each other, if two ports 102 are stacked above each other.

Figure 22:
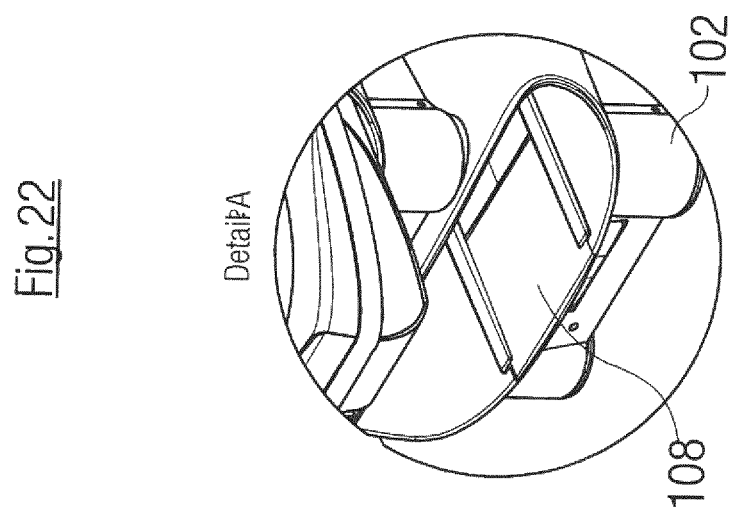

As particularly can be recognized in FIG. 22, the charger 100 comprises a detector 108 at each of its ports 102. The detector 108 is formed as a card reader in the shown embodiment which detects a membership card in form of a card as a means of identification. If a valid ID is detected, a signal is given to a retainer 109 shown in FIGS. 16a and 16b. The retainer 109 engages behind the pump 16 so that it cannot be removed from the port 102, as far as no signal is received from the detector 108. If the retainer 109 receives a signal from the detector 108, the pump 16 is released so that the user can remove the pump 16 from the port 102.

As can be seen in FIGS. 18a to 18p, a hanger 110 has a holding portion 112 and an attachment portion 114. The holding portion 112 is open at its top in vertical direction so that the pump 16 can be inserted into the holding portion 112 from above. The inner dimensions of the holding portion 112 are adapted to the outer dimensions of the pump 16 so that the pump 16 can be inserted into the holding portion 112 so that the pump 16 can be securely arranged.

The attachment portion 114 has a base section 116 and a contact section 118. The base section 116 and the contact section 118 form an abutting section 120. A rod 122 of an apparatus is pressed against the abutting section 120 by a fastening section 124 in form of a cable tie. Therefore, the attachment portion 114 comprises holes 130, through which the fastening section 124 can be led. The abutting section 120 comprises an abutting surface 126, as can be seen in FIGS. 19 to 19c, or abutting protrusions 128, as can be seen in FIGS. 18a to 18p and 19a. The abutting protrusions 128 a formed as rubber pimples. Depending on the size of the rod 122, the abutting surface 126 or the abutting protrusions 128, serving as contact section 118, can be plugged or screwed into the base section 116. The fastening sections 124 can be led through holes 130. The holes 130 are arranged in recesses 132 of the holding portion 112 so that even particularly thick fastening section 124 can be used.

The recesses 132 are reinforced by reinforcements 134 which can also be formed by an abutting section 120 in case of horizontally arranged rods 122. Moreover, the reinforcements 134 form an abutting section 120 for attachment to vertical rods, wherein this one is particularly suitable for rods with a large diameter. The reinforcements 134 furthermore comprise openings, through which fastening sections 124 can be led for fastening. By support of the holes 130 and the reinforcements 134 the fastening sections 124 can be arranged variously for adapting the attachment of the hanger 110 to the present situation. The different attachment possibilities of the fastening sections 124 are exemplified in FIGS. 18a to 18p. Furthermore, the holding portion 112 is dimensioned so that it can non-distortedly receive the pump 16.

A rack 140 is assigned to the charger 100. In the embodiment shown in FIG. 21, the rack 140 is provided by three stands 142 with each of them being able to receive the carrier 12 or the pressure belt 14. Therefore, the stand 142 comprises horizontal rods 144, over which the carrier 12 or the pressure belt 14 can be laid.

LIST OF REFERENCES

| | |
|---|---|
| 10 | piece of fitness equipment |
| 12 | carrier |
| 14 | pressure belt |
| 16 | pump |
| 18 | holder |
| 20 | object |
| 22 | pouch |
| 24 | lid |
| 26 | first pressure chamber |
| 28 | second pressure chamber |
| 30 | first fitting |

| | |
|---|---|
| 32 | second fitting |
| 34 | first tube |
| 36 | second tube |
| 38 | welding |
| 40 | first end portion |
| 41 | hook section |
| 42 | first base section |
| 44 | first branch section |
| 46 | second base section |
| 48 | second branch section |
| 50 | second end portion |
| 51 | loop portion |
| 52 | hose |
| 54 | first end piece |
| 56 | first connecting portion |
| 58 | angle piece |
| 60 | main body |
| 62 | second end |
| 63 | loop tape |
| 63a | further loop tape |
| 64 | holder |
| 66 | strap |
| 68 | first end |
| 69 | hook tape |
| 70 | first opening |
| 72 | second opening |
| 74 | pocket |
| 76 | lock |
| 77 | switch |
| 78 | hook tape |
| 80 | connection |
| 82 | battery |
| 84 | compressor |
| 86a | first valve |
| 86b | second valve |
| 87 | tube |
| 88 | bottom plate |
| 90 | damping layer |
| 92 | circuit board |
| 93 | bracket |
| 94 | lid |
| 95 | circumferential frame |
| 96 | sensor |
| 97 | detector |
| 98 | notifier |
| 99 | controller |
| 100 | charger |
| 102 | port |
| 104 | counter contact portion |
| 105 | contact surface |
| 106 | contact portion |
| 107 | contact peg |
| 108 | detector |
| 109 | retainer |
| 110 | hanger |
| 112 | holding portion |
| 114 | attachment portion |
| 116 | base section |
| 118 | contact section |
| 120 | abutting section |
| 122 | rod |
| 124 | fastening section |
| 126 | abutting surfaces |
| 128 | abutting protrusion |
| 130 | hole |
| 132 | recess |
| 134 | reinforcement |
| 140 | rack |
| 142 | stand |
| 144 | horizontal rod |

The invention claimed is:

1. A piece of fitness equipment for increasing fat burning in a body part of a person by stimulating the blood circulation within the body part comprising:
a pressure belt for applying pressure to the body part that can fit closely to the body part and comprises at least one pressure chamber, to which fluid can be applied and that includes a fitting forming an air passageway that is bent;
a pump that is capable of applying the fluid to the at least one pressure chamber;
at least one tube that connects the at least one pressure chamber with the pump and is releasably connected to the fitting by a fluid-tight quick-release coupler;
a carrier for carrying the pump on the body part, the carrier comprising a main body having a first end and a second end as well as an inner side facing towards the body part and an outer side facing away from the body part,
a fastener for connecting the first end and the second end with each other in such a way that the body part is surrounded,
the pump being detachable from and attachable to the main body, and
the carrier being capable of being arranged above the pressure belt, thereby further increasing the pressure applied to the body part as a result of the pressure applied by the pressure belt no longer being effective in a direction leading away from the body part.

2. The piece of fitness equipment according to claim 1, further comprising a holder for the pump being arranged at the inner side.

3. The piece of fitness equipment according to claim 2, wherein the holder has a first opening and a second opening with the second opening being arranged oppositely to the first opening.

4. The piece of fitness equipment according to claim 2, wherein the main body has at least one strap configured to fasten the at least one tube at the inner side.

5. The piece of fitness equipment according to claim 1, wherein the main body is made of a textile comprising a breathable material that is elastic.

6. The piece of fitness equipment according to claim 1, wherein the fastener comprises a hook tape, which is arranged at an inner side of the main body at the first end, and a loop tape, which is arranged at an outer side of the main body at the second end, with the hook tape being engageable with the loop tape for connecting the first end with the second end.

7. The piece of fitness equipment according to claim 6, wherein the main body is provided with a further loop tape at the outer side.

8. The piece of fitness equipment according to claim 7, further comprising an object holder for attaching an object, with the object holder being made of an elastic textile material.

9. The piece of fitness equipment according to claim 8, wherein the object holder is detachably attached to the main body with the object holder having a second hook tape for the detachable attachment to at least one of the loop tape and the further loop tape of the carrier.

10. The piece of fitness equipment according to claim 1 further comprising:
a controller for controlling the pump.

11. The piece of fitness equipment according to claim 1, wherein the at least one pressure chamber comprises a first pressure chamber and a second pressure chamber, the fitting being one of a first fitting and a second fitting, the at least one tube comprising a first tube and a second tube, the fluid-tight quick-release coupler being one of a fluid-type first quick-release coupler and a fluid-type second quick-release coupler, and the pressure belt further comprising:

the first fitting including a first connecting portion and being connected with the first pressure chamber;

the second fitting including a second connecting portion and being connected with the second pressure chamber;

the first tube being arranged to connect the first pressure chamber with the pump and having a first end piece;

the second tube being arranged to connect the second pressure chamber with the pump and having a second end piece with the second connecting portion and the second end piece forming the fluid-tight second quick-release coupler, and with the first fitting and the second fitting each being bent.

12. The piece of fitness equipment according to claim 1, wherein the fitting is bent by 90°.

13. The piece of fitness equipment according to claim 1, wherein the pressure belt has a first end portion, a second end portion and a lock by which the first end portion and the second end portion are connectable and with the lock being configured to be a detachable connection.

14. The piece of fitness equipment according to claim 11, wherein:

the first pressure chamber includes a first base section, which extends linearly, and at least two first branch sections which branch off the base section, and the second pressure chamber includes a second base section, which extends linearly, and at least two second branch sections, which branch off the second base section, with the second branch sections being respectively arranged between the first branch sections.

15. The piece of fitness equipment according to claim 11, wherein at least one of the first pressure chamber and the second pressure chamber is manufactured of two layers, which are welded together for separating the first pressure chamber and the second pressure chamber.

16. The piece of fitness equipment according to claim 1, wherein the pump includes a sensor that measures the pressure of the fluid inside the at least one tube.

17. The piece of fitness equipment according to claim 1, wherein the pump includes a rechargeable battery, a detector provides for detecting a state of charge of the battery, and a notifier provides for issuing of a message.

* * * * *